US008364665B2

(12) United States Patent
Su et al.

(10) Patent No.: US 8,364,665 B2
(45) Date of Patent: Jan. 29, 2013

(54) DIRECTIONAL EXPRESSION-BASED SCIENTIFIC INFORMATION KNOWLEDGE MANAGEMENT

(75) Inventors: Qiaojuan Jane Su, San Jose, CA (US); Ilya Kupershmidt, San Francisco, CA (US)

(73) Assignee: NextBio, Santa Clara, CA (US)

( * ) Notice: Subject to any disclaimer, the term of this patent is extended or adjusted under 35 U.S.C. 154(b) by 413 days.

(21) Appl. No.: 12/234,435

(22) Filed: Sep. 19, 2008

(65) Prior Publication Data

US 2009/0049019 A1 Feb. 19, 2009

Related U.S. Application Data

(63) Continuation-in-part of application No. 11/641,539, filed on Dec. 18, 2006, now Pat. No. 8,275,737.

(60) Provisional application No. 60/974,289, filed on Sep. 21, 2007, provisional application No. 60/750,829, filed on Dec. 16, 2005.

(51) Int. Cl.
*G06F 7/00* (2006.01)
*G06F 17/00* (2006.01)
(52) U.S. Cl. ......... 707/723; 707/758; 707/805; 707/954
(58) Field of Classification Search .................. 707/603, 707/723, 758, 805, 954; 705/45, 924
See application file for complete search history.

(56) References Cited

U.S. PATENT DOCUMENTS

| | | | |
|---|---|---|---|
| 5,153,178 A | 10/1992 | Maroko | |
| 6,151,601 A | 11/2000 | Papiernak et al. | |
| 6,286,002 B1 | 9/2001 | Axaopoulos et al. | |
| 6,408,308 B1 | 6/2002 | Maslyn et al. | |
| 6,465,183 B2 | 10/2002 | Wolber | |
| 6,580,910 B1 * | 6/2003 | Mazur et al. | 455/440 |
| 6,836,877 B1 * | 12/2004 | Dupenloup | 716/103 |
| 6,925,455 B2 | 8/2005 | Gong et al. | |
| 6,947,846 B2 | 9/2005 | Quake et al. | |
| 7,072,665 B1 | 7/2006 | Blumberg et al. | |
| 7,103,519 B2 | 9/2006 | Singarajan et al. | |
| 7,155,453 B2 * | 12/2006 | Kincaid | 707/770 |
| 7,225,183 B2 * | 5/2007 | Gardner | 707/999.003 |
| 7,243,112 B2 * | 7/2007 | Qu et al. | 707/999.003 |
| 2001/0005852 A1 | 6/2001 | Bogle et al. | |
| 2001/0016314 A1 | 8/2001 | Anderson et al. | |
| 2002/0093591 A1 | 7/2002 | Gong et al. | |
| 2002/0137031 A1 | 9/2002 | Wolber | |
| 2002/0150966 A1 | 10/2002 | Muraca | |
| 2002/0159642 A1 | 10/2002 | Whitney | |

(Continued)

FOREIGN PATENT DOCUMENTS

WO 01/55951 8/2001

OTHER PUBLICATIONS

Kupershmidt, Ilya, et al., U.S. Appl. No. 11/641,539 titled, "System and Method for Scientific Information Knowledge Management," filed Dec. 18, 2006.

(Continued)

*Primary Examiner* — Phong Nguyen
(74) *Attorney, Agent, or Firm* — Weaver Austin Villeneuve & Sampson LLP

(57) ABSTRACT

The present invention relates to methods, systems and apparatus for capturing, integrating, organizing, navigating and querying large-scale data from high-throughput biological and chemical assay platforms. It provides a highly efficient meta-analysis infrastructure for performing research queries across a large number of studies and experiments from different biological and chemical assays, data types and organisms, as well as systems to build and add to such an infrastructure. In particular, aspects of the invention relate to integrating, organizing, navigating and querying "directional" data, such as gene expression profiles.

18 Claims, 26 Drawing Sheets

U.S. PATENT DOCUMENTS

| | | | |
|---|---|---|---|
| 2003/0055619 A1 | 3/2003 | Singarajan et al. | |
| 2004/0071700 A1* | 4/2004 | Kim et al. | 424/145.1 |
| 2004/0073955 A1* | 4/2004 | Chung | 800/3 |
| 2004/0122708 A1 | 6/2004 | Avinash et al. | |
| 2004/0122790 A1* | 6/2004 | Walker et al. | 707/1 |
| 2004/0162852 A1* | 8/2004 | Qu et al. | 707/104.1 |
| 2005/0081188 A1 | 4/2005 | Kumar et al. | |
| 2006/0277016 A1* | 12/2006 | Kouchi et al. | 703/11 |
| 2006/0287106 A1 | 12/2006 | Jensen | |
| 2007/0118399 A1 | 5/2007 | Avinash et al. | |
| 2007/0156692 A1* | 7/2007 | Rosewarne | 707/9 |
| 2007/0162411 A1 | 7/2007 | Kupershmidt et al. | |
| 2008/0103995 A1 | 5/2008 | Mohamed et al. | |
| 2009/0222400 A1 | 9/2009 | Kupershmidt et al. | |
| 2010/0318528 A1 | 12/2010 | Kupershmidt et al. | |

OTHER PUBLICATIONS

Kupershmidt, Ilya, et al., U.S. Appl. No. 12/398,107, titled "Categorization and Filtering of Scientific Data," filed Mar. 4, 2009.

PCT International Search Report and Written Opinion of the International Searching Authority mailed Mar. 20, 2008, Application No. PCT/US2006/048067.

PCT International Search Report and Written Opinion of the International Searching Authority mailed Dec. 4, 2008, Application No. PCT/US08/77097.

PCT Notification of Transmittal of the International Search Report and the Written Opinion of the International Searching Authority, or the Declaration, mailed May 6, 2009, Application No. PCT/US 06/36058, 9 pages.

Raja, Alexandra, "Querying Microarray Databases," Masters Thesis, University of Texas, Published: Dec. 2005 [retrieved by Foreign Examiner on Apr. 21, 2009]. Retrieved from the Internet: <URL: https://dspace.uta.edu/bitstream/10106/251/1/umi-uta-1117.pdf>, 163 pages.

Office Action mailed Sep. 29, 2010 from U.S. Appl. No. 11/641,539.

Final Office Action mailed May 11, 2011 from U.S. Appl. No. 11/641,539.

Kupershmidt, et al., U.S. Appl. No. 12/796,545, titled "Sequence-Centric Scientific Information Management," filed Jun. 8, 2010.

Supplemental European Search Report mailed Mar. 23, 2012, Application No. EP 06 84 7688.6.

Barrett, T., et al., "NCBI GEO: Mining Millions of Expression Profiles—Database and Tools," vol. 33, Nucleic Acids Research, Database Issue, 2005, pp. D562-0566.

Shah, S. P., et al., "Atlas—a Data Warehouse for Integrative Bioinformatics," London GB, vol. 6, No. 34, Feb. 21, 2005, pp. 1-16.

Liu, W., et al. "Rank-Based Algorithms for Analysis of Microarrays," Proceedings of SPIE, US, vol. 4266, Jun. 1, 2001, pp. 56-67.

Kupershmidt, et al., "Ontology-Based Meta-Analysis of Global Collections of High-Throughput Public Data," PLoS ONE, vol. 5, No. 9, Sep. 2010, pp. 1-13.

Office Action dated Jan. 24, 2012 for U.S. Appl. No. 12/398,107.

Office Action dated Jan. 26, 2012 for U.S. Appl. No. 12/796,545.

* cited by examiner

| 121 | 119 | 117 | 115 | 111 |
|---|---|---|---|---|
| Rank | Imported ID | Mapped To | Symbol | fold change |
| 1 | 203029_s_at | 5799 | PTPRN2 | +140.7 |
| 2 | 203030_s_at | 5799 | PTPRN2 | +91.93 |
| 3 | 206172_at | 3598 | IL13RA2 | -44.63 |
| 4 | 200665_s_at | 6678 | SPARC | -34.89 |
| 5 | 206785_s_at | 3822 | KLRC2 | -31.45 |
| 6 | 202947_s_at | 2995 | GYPC | -12.92 |
| 7 | 217388_s_at | 8942 | KYNU | -12.08 |
| 8 | 219249_s_at | 60681 | FKBP10 | +8.517 |
| 9 | 205767_at | 2069 | EREG | +8.492 |
| 10 | 201787_at | 2192 | FBLN1 | -7.175 |
| 11 | 201645_at | 3371 | TNC | +6.811 |
| 12 | 220374_at | 54813 | BTBD5 | +6.323 |
| 13 | 213711_at | 3887 | KRTHB1 | -5.962 |
| 14 | 204748_at | 5743 | PTGS2 | +5.878 |
| 15 | 201720_s_at | 7805 | LAPTM5 | +5.576 |
| 16 | 214609_at | 401 | PHOX2A | -5.073 |
| 17 | 219776_s_at | NM_018331 |  | -5.043 |
| 18 | 204205_at | 60489 | APOBEC3G | +4.985 |
| 19 | 214833_at | 9725 | TMEM63A | +4.724 |
| 20 | 213194_at | 6091 | ROBO1 | +4.622 |
| 21 | 212190_at | 5270 | SERPINE2 | -4.401 |
| 22 | 210145_at | 5321 | PLA2G4A | +4.38 |
| 23 | 220217_x_at | 64663 | SPANXC | -4.361 |
| 24 | 216268_s_at | 182 | JAG1 | +4.275 |
| 25 | 220922_s_at | 30014 | SPANXA1 | -4.226 |
| 26 | 201417_at | AL136179 |  | +4.215 |
| 27 | 213669_at | 23149 | FCHO1 | -4.165 |
| 28 | 201288_at | 397 | ARHGDIB | -4.084 |
| 29 | 220819_at | 79981 | FRMD1 | +4.042 |
| 30 | 215805_at | 23517 | SKIV2L2 | +4.036 |
| 31 | 213428_s_at | 1291 | COL6A1 | -4.002 |
| 32 | 33304_at | 3669 | ISG20 | -3.979 |
| 33 | 201069_at | 4313 | MMP2 | -3.638 |
| 34 | 213802_at | 8492 | PRSS12 | -3.163 |

Figure 1B

| 121 Rank | 119 Imported ID | 117 Mapped To | 115 Symbol | 111 fold change | 113 direction |
|---|---|---|---|---|---|
| 1 | 203029_s_at | 5799 | PTPRN2 | 140.7 | + |
| 2 | 203030_s_at | 5799 | PTPRN2 | 91.93 | + |
| 8 | 219249_s_at | 60681 | FKBP10 | 8.517 | + |
| 9 | 205767_at | 2069 | EREG | 8.492 | + |
| 11 | 201645_at | 3371 | TNC | 6.811 | + |
| 12 | 220374_at | 54813 | BTBD5 | 6.323 | + |
| 14 | 204748_at | 5743 | PTGS2 | 5.878 | + |
| 15 | 201720_s_at | 7805 | LAPTM5 | 5.576 | + |
| 18 | 204205_at | 60489 | APOBEC3G | 4.985 | + |
| 19 | 214833_at | 9725 | TMEM63A | 4.724 | + |
| 20 | 213194_at | 6091 | ROBO1 | 4.622 | + |
| 22 | 210145_at | 5321 | PLA2G4A | 4.38 | + |
| 24 | 216268_s_at | 182 | JAG1 | 4.275 | + |
| 26 | 201417_at | AL136179 | | 4.215 | + |
| 29 | 220819_at | 79981 | FRMD1 | 4.042 | + |
| 30 | 215805_at | 23517 | SKIV2L2 | 4.036 | + |

Figure 1C

| 952 Rank | 954 Imported ID | 956 Mapped To | 958 Symbol | 960 p-value | 962 fold change | |
|---|---|---|---|---|---|---|
| 1 | 203029_s_at | 5799 | PTPRN2 | 0.0032 | 140.7 | |
| 2 | 203030_s_at | 5799 | PTPRN2 | 6.49E-05 | 91.93 | |
| 3 | 206172_at | 3598 | IL13RA2 | 0.00825 | 44.63 | |
| 4 | 200665_s_at | 6678 | SPARC | 3.02E-04 | 34.89 | |
| 5 | 206785_s_at | 3822 | KLRC2 | 0.00149 | 31.45 | |
| 6 | 202947_s_at | 2995 | GYPC | 5.70E-05 | 12.92 | |
| 7 | 217388_s_at | 8942 | KYNU | 0.00269 | 12.08 | |
| 8 | 219249_s_at | 60681 | FKBP10 | 0.00205 | 8.517 | |
| 9 | 205767_at | 2069 | EREG | 0.00277 | 8.492 | |
| 10 | 201787_at | 2192 | FBLN1 | 0.0051 | 7.175 | |
| 11 | 201645_at | 3371 | TNC | 0.00497 | 6.811 | Stop1 |
| 12 | 220374_at | 54813 | BTBD5 | 0.00239 | 6.323 | |
| 13 | 213711_at | 3887 | KRTHB1 | 8.50E-04 | 5.962 | Stop2 |
| 14 | 204748_at | 5743 | PTGS2 | 0.00346 | 5.878 | |
| 15 | 201720_s_at | 7805 | LAPTM5 | 0.00869 | 5.576 | |
| 16 | 214609_at | 401 | PHOX2A | 0.00204 | 5.073 | |
| 17 | 219776_s_at | NM_018331 | | 0.001 | 5.043 | Stop3 |
| 18 | 204205_at | 60489 | APOBEC3G | 0.00312 | 4.985 | Stop4 |
| 19 | 214833_at | 9725 | TMEM63A | 0.00858 | 4.724 | |
| 20 | 213194_at | 6091 | ROBO1 | 0.001 | 4.622 | |
| 21 | 212190_at | 5270 | SERPINE2 | 0.00106 | 4.401 | |
| 22 | 210145_at | 5321 | PLA2G4A | 0.00945 | 4.38 | Stop5 |
| 23 | 220217_x_at | 64663 | SPANXC | 0.00231 | 4.361 | |
| 24 | 216268_s_at | 182 | JAG1 | 0.00189 | 4.275 | |
| 25 | 220922_s_at | 30014 | SPANXA1 | 0.00447 | 4.226 | |
| 26 | 201417_at | AL136179 | | 0.00231 | 4.215 | |
| 27 | 213669_at | 23149 | FCHO1 | 1.18E-05 | 4.165 | |
| 28 | 201288_at | 397 | ARHGDIB | 0.00101 | 4.084 | |
| 29 | 220819_at | 79981 | FRMD1 | 7.96E-04 | 4.042 | |
| 30 | 215805_at | 23517 | SKIV2L2 | 0.00962 | 4.036 | |
| 31 | 213428_s_at | 1291 | COL6A1 | 0.00883 | 4.002 | Stop6 |
| 32 | 33304_at | 3669 | ISG20 | 0.00324 | 3.979 | |
| 33 | 201069_at | 4313 | MMP2 | 0.00887 | 3.638 | |
| 34 | 213802_at | 8492 | PRSS12 | 0.00634 | 3.163 | |

Figure 9B

| F1 | | F2 | |
|---|---|---|---|
| | Rank | | Rank |
| Stop 1 F1(1) | 1 | | 1 |
| | 2 | Stop 1 F2(1) | 2 |
| | 3 | | 3 |
| | 4 | | 4 |
| Stop 2 F1(2) | 5 | | 5 |
| | 6 | | 6 |
| | 7 | Stop 2 F2(2) | 7 |
| | 8 | | 8 |
| | 9 | | 9 |
| | 10 | | 10 |
| Stop 3 F1(3) | 11 | | 11 |
| | 12 | | 12 |
| | 13 | Stop 3 F2(3) | 13 |
| | 14 | | 14 |
| | 15 | | 15 |
| | 16 | | 16 |
| | 17 | | 17 |
| Stop 4 F1(4) | 18 | | 18 |
| Stop 5 F1(5) | 19 | | 19 |
| | 20 | | 20 |
| | 21 | | 21 |
| | 22 | | 22 |
| | 23 | | 23 |
| | 24 | | 24 |
| | 25 | | 25 |
| | 26 | | 26 |
| | 27 | Stop 4 F2(4) | 27 |
| | 28 | | 28 |
| | 29 | | 29 |
| | 30 | | 30 |
| | 31 | Stop 5 F2(5) | 31 |
| | 32 | | 32 |
| | 33 | | 33 |
| Stop 6 F1(6) | 34 | | 34 |
| | 35 | | 35 |
| | 36 | | 36 |
| | 37 | | 37 |
| | 38 | | 38 |
| | 39 | | 39 |
| | 40 | Stop 6 F2(6) | 40 |

DIRECTIONAL EXPRESSION-BASED SCIENTIFIC INFORMATION KNOWLEDGE MANAGEMENT

CROSS REFERENCE TO RELATED APPLICATIONS

This application claims benefit under 35 U.S.C. §119(e) of U.S. Provisional Patent Application 60/974,289, also titled "Directional Expression-Based Scientific Information Knowledge Management," filed Sep. 21, 2007 and incorporated by reference herein in its entirety. This application is also a continuation-in-part of and claims priority to U.S. patent application Ser. No. 11/641,539, published as U.S. Patent Publication 20070162411, titled "System And Method For Scientific Information Knowledge Management," filed Dec. 18, 2006, which in turn claims benefit under 35 U.S.C. §119(e) of U.S. Provisional Patent Application 60/750,829, filed Dec. 16, 2005. These applications are incorporated by reference herein in their entireties.

BACKGROUND OF THE INVENTION

The present invention relates generally to methods, systems and apparatus for storing and retrieving biological, chemical and medical information. Research in these fields has increasingly shifted from the laboratory bench to computer-based methods. Public sources such as NCBI (National Center for Biotechnology Information), for example, provide databases with genetic and molecular data. Between these and private sources, an enormous amount of data is available to the researcher from various assay platforms, organisms, data types, etc. As the amount of biomedical information disseminated grows, researchers need fast and efficient tools to quickly assimilate new information and integrate it with pre-existing information across different platforms, organisms, etc. Researchers also need tools to quickly navigate through and analyze diverse types of information.

SUMMARY OF THE INVENTION

The present invention relates to methods, systems and apparatus for capturing, integrating, organizing, navigating and querying large-scale data from high-throughput biological and chemical assay platforms. It provides a highly efficient meta-analysis infrastructure for performing research queries across a large number of studies and experiments from different biological and chemical assays, data types and organisms, as well as systems to build and add to such an infrastructure. In particular, aspects of the invention relate to integrating, organizing, navigating and querying "directional" data, such as gene expression profiles.

Certain aspects of the invention relate to feature sets that contain information about direction of change of features between experimental and control conditions. A feature set is a "derived" data set from the "raw data" taken from one or more experiments on one or more samples. A directional feature set is a feature set that contains information about the direction of change in a feature relative to a control. Bi-directional feature sets, for example, contain information about features that are up-regulated and features that are down-regulated in response to a control. One example of a bi-directional feature set is a gene expression profile that contains information about up and down regulated genes in a particular disease state relative to normal state, or in a treated sample relative to a non-treated control.

One aspect of the invention relates to methods of integrating expression-based data into a knowledge base having at least one pre-existing bi-directional feature set. Each bi-directional feature set includes a list of features (e.g., genes, proteins, SNPs, chemical compounds) and, for at least some of the listed features, up or down expression information relative to a control. In one example, a bi-directional feature set includes information about the feature expression signature of a disease. In another example, a bi-directional feature set includes information about the feature expression response to a stimulus or compound. The methods involve receiving a bi-directional input feature set containing a list of features and, for at least some of the listed features, up or down regulation expression information relative to a control and automatically correlating the input feature set with a plurality or all other pre-existing bi-directional feature sets. Automatically correlating the input feature set with a bi-directional pre-existing feature set involves determining multiple individual correlation scores and, from the multiple individual correlation scores, determining an overall correlation score and a correlation direction that indicates if the input feature set is positively or negatively correlated to the pre-existing feature set, and the magnitude or extent of that correlation.

The multiple individual correlation scores may include one or more positive and negative correlation scores, with the positive correlation score indicating a degree of positive correlation between the input feature set and the pre-existing feature set and the negative correlation score indicating a degree of negative correlation between the input feature set and the pre-existing feature set. Determining a positive correlation score may involve correlating the up-regulation expression information of the input feature set with the up-regulation expression information of the pre-existing feature set and/or correlating the down-regulation expression information of the input feature set with the down-regulation expression information of the pre-existing feature set. Determining the one or more negative correlation scores may involve correlating the up-regulation expression information of the input feature set with the down-regulation expression information of the pre-existing feature set and/or correlating the down-regulation expression information of the input feature set with the up-regulation expression information of the pre-existing feature set. Determining a correlation direction may involve comparing the one or more positive correlation scores with the one or more negative correlation scores.

The input feature set may also be automatically correlated to a plurality or all of the non-directional feature sets that may be present in the knowledge base. Automatically correlating the input feature set to a non-directional feature set may involve determining multiple individual correlation scores and from the multiple individual correlation scores, selecting the score that indicates the best correlation of the input feature set with the non-directional feature set. Determining these multiple individual correlation scores may involve correlating the up-regulation expression information of the input feature set with the non-directional feature set and correlating the down-regulation expression information of input feature set with the non-directional feature set. The methods may involve storing at least the overall correlation scores and correlation directions for use in replying to user queries involving a feature set.

Another aspect of the invention relates to computer implemented methods of conducting queries in a knowledge base of chemical and/or biological information that includes a plurality of feature sets, each feature set containing a list of chemical or biological features and associated statistical information. The methods involve receiving a query identifying at least one feature set having up and down feature regulation expression information, wherein the query is received from a user input to a computer system, using precomputed correlation scores between the at least one identified feature set and other content in the knowledge base to determine feature set rankings in reply to said query; and presenting the user with a ranked list of feature sets as determined by the precomputed correlation scores, and, for at least some of the feature sets in the ranked list, an indication of whether the correlation of that feature set with the identified feature set is positive or negative.

In certain embodiments, the methods further involve presenting the user with information about the correlation between each of the up and down regulation expression information of the identified feature set and each of the up and down feature regulation expression information of at least one listed feature set.

These and other features and advantages of the invention will be described in more detail below with reference to the drawings.

BRIEF DESCRIPTION OF THE DRAWINGS

FIG. 1B is a representation of a directional feature set including up- and down-expressed features.

FIG. 1C is a representation of the up-expressed features from the feature set shown in FIG. 1B.

FIG. 9B is an example of a feature table of a feature set that may be correlated to a feature group. Stop or checkpoints used in a correlation process are shown on the diagram.

FIG. 11B is a representation of features lists of two feature sets (F1 and F2) that are to be correlated to one another. Stop or checkpoints used in a correlation process are shown on the diagram.

FIGS. 16B-16D are screen shots depicting query results window for a feature set versus feature sets query.

DETAILED DESCRIPTION OF THE PREFERRED EMBODIMENTS

1. Introduction and Relevant Terminology

Figure 1A:
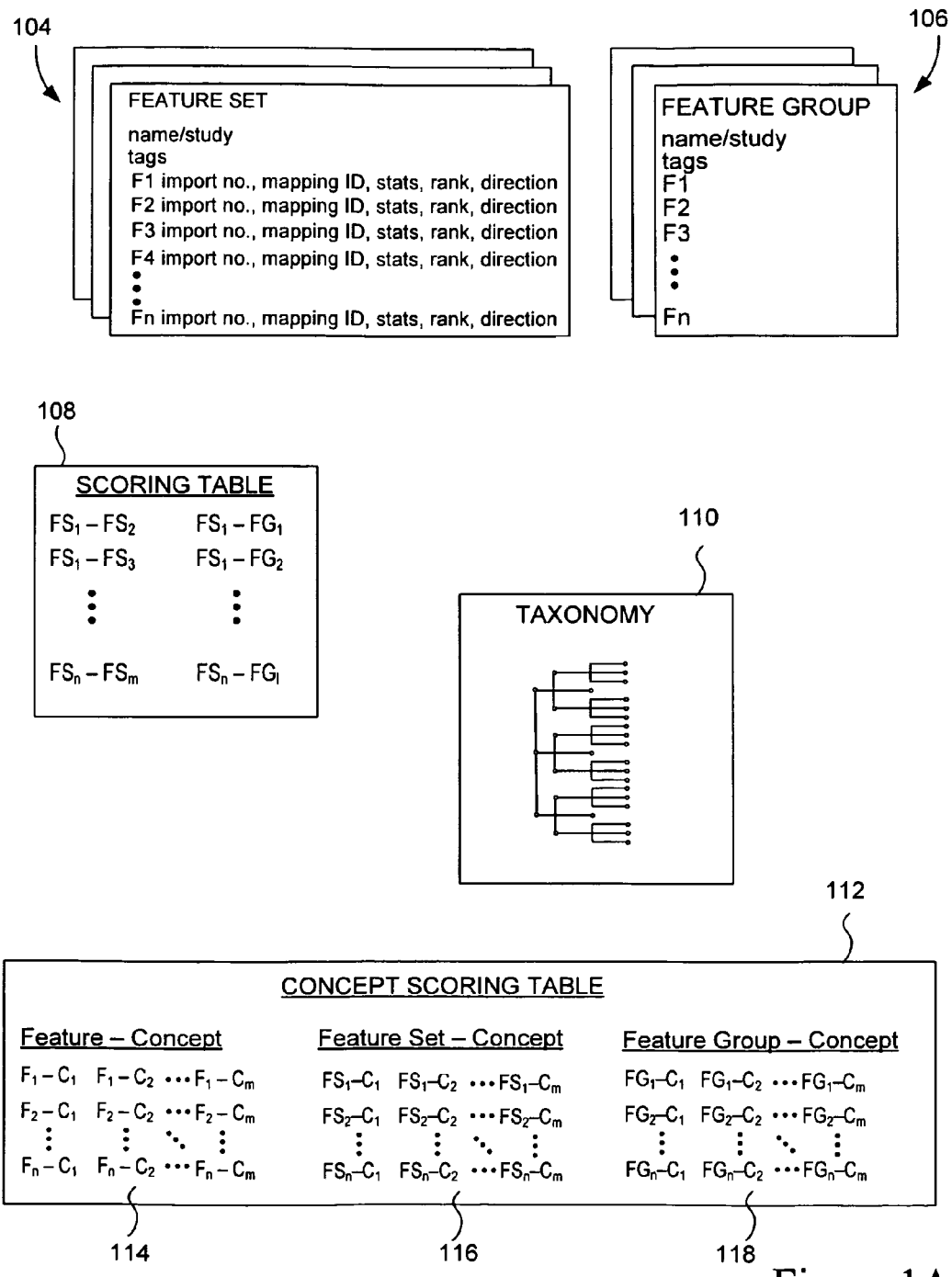
FIG. 1A is a schematic representation of various elements in a knowledge base that may be used in accordance with various embodiments of the present invention.

The present invention relates to methods, systems and apparatus for capturing, integrating, organizing, navigating and querying large-scale data from high-throughput biological and chemical assay platforms. It provides a highly efficient meta-analysis infrastructure for performing research queries across a large number of studies and experiments from different biological and chemical assays, data types and organisms, as well as systems to build and add to such an infrastructure.

While most of the description below is presented in terms of systems, methods and apparatuses that integrate and allow exploration of data from biological experiments and studies, the invention is by no means so limited. For example, the invention covers chemical and clinical data. In the following description, numerous specific details are set forth in order to provide a thorough understanding of the present invention. It will be apparent, however, that the present invention may be practiced without limitation to some of the specific details presented herein.

The following terms are used throughout the specification. The descriptions are provided to assist in understanding the specification, but do not necessarily limit the scope of the invention.

Raw data—This is the data from one or more experiments that provides information about one or more samples. Typically, raw data is not yet processed to a point suitable for use in the databases and systems of this invention. Subsequent manipulation reduces it to the form of one or more "feature sets" suitable for use in such databases and systems. The process of converting the raw data to feature sets is sometimes referred to as curation.

Most of the examples presented herein concern biological experiments in which a stimulus acts on a biological sample such as a tissue or cell culture. Often the biological experiment will have associated clinical parameters such as tumor stage, patient history, etc. The invention is not however limited to biological samples and may involve, for example, experiments on non-biological samples such as chemical compounds, various types of synthetic and natural materials, etc. and their effects on various types of assays (e.g., cancer cell line progression).

Whether working with biological or non-biological samples, the sample may be exposed to one or more stimuli or treatments to produce test data. Control data may also be produced. The stimulus is chosen as appropriate for the particular study undertaken. Examples of stimuli that may be employed are exposure to particular materials or compositions, radiation (including all manner of electromagnetic and particle radiation), forces (including mechanical (e.g., gravitational), electrical, magnetic, and nuclear), fields, thermal energy, and the like. General examples of materials that may be used as stimuli include organic and inorganic chemical compounds, biological materials such as nucleic acids, carbohydrates, proteins and peptides, lipids, various infectious agents, mixtures of the foregoing, and the like. Other general examples of stimuli include non-ambient temperature, non-ambient pressure, acoustic energy, electromagnetic radiation of all frequencies, the lack of a particular material (e.g., the lack of oxygen as in ischemia), temporal factors, etc. As suggested, a particularly important class of stimuli in the context of this invention is exposure to therapeutic agents (including agents suspected of being therapeutic but not yet proven to have this property). Often the therapeutic agent is a chemical compound such as a drug or drug candidate or a compound present in the environment. The biological impact of chemical compounds is manifest as a change in a feature such as a level of gene expression or a phenotypic characteristic.

As suggested, the raw data will include "features" for which relevant information is produced from the experiment. In many examples the features are genes or genetic information from a particular tissue or cell sample exposed to a particular stimulus.

A typical biological experiment determines expression or other information about a gene or other feature associated with a particular cell type or tissue type. Other types of genetic features for which experimental information may be collected in raw data include SNP patterns (e.g., haplotype blocks), portions of genes (e.g., exons/introns or regulatory motifs), regions of a genome of chromosome spanning more than one gene, etc. Other types of biological features include phenotypic features such as the morphology of cells and cellular organelles such as nuclei, Golgi, etc. Types of chemical features include compounds, metabolites, etc.

The raw data may be generated from any of various types of experiments using various types of platforms (e.g., any of a number of microarray systems including gene microarrays, SNP microarrays and protein microarrays, cell counting systems, High-Throughput Screening ("HTS") platforms, etc.). For example, an oligonucleotide microarray is also used in experiments to determine expression of multiple genes in a particular cell type of a particular organism. In another example, mass spectrometry is used to determine abundance of proteins in samples.

Feature set—This refers to a data set derived from the "raw data" taken from one or more experiments on one or more samples. The feature set includes one or more features (typically a plurality of features) and associated information about the impact of the experiment(s) on those features. At some point, the features of a feature set may be ranked (at least temporarily) based on their relative levels of response to the stimulus or treatment in the experiment(s) or based on their magnitude and direction of change between different phenotypes, as well as their ability to differentiate different phenotypic states (e.g., late tumor stage versus early tumor stage).

For reasons of storage and computational efficiency, for example, the feature set may include information about only a subset of the features or responses contained in the raw data. As indicated, a process such as curation converts raw data to feature sets.

Typically the feature set pertains to raw data associated with a particular question or issue (e.g., does a particular chemical compound interact with proteins in a particular pathway). Depending on the raw data and the study, the feature set may be limited to a single cell type of a single organism. From the perspective of a "Directory," a feature set belongs to a "Study." In other words, a single study may include one or more feature sets.

In many embodiments, the feature set is either a "bioset" or a "chemset." A bioset typically contains data providing information about the biological impact of a particular stimulus or treatment. The features of a bioset are typically units of genetic or phenotypic information as presented above. These are ranked based on their level of response to the stimulus (e.g., a degree of up or down regulation in expression), or based on their magnitude and direction of change between different phenotypes, as well as their ability to differentiate different phenotypic states (e.g., late tumor stage versus early tumor stage). A chemset typically contains data about a panel of chemical compounds and how they interact with a sample, such as a biological sample. The features of a chemset are typically individual chemical compounds or concentrations of particular chemical compounds. The associated information about these features may be EC50 values, IC50 values, or the like.

A feature set typically includes, in addition to the identities of one or more features, statistical information about each feature and possibly common names or other information about each feature. A feature set may include still other pieces of information for each feature such as associated description of key features, user-based annotations, etc. The statistical information may include p-values of data for features (from the data curation stage), "fold change" data, and the like. A fold change indicates the number of times (fold) that expression is increased or decreased in the test or control experiment (e.g., a particular gene's expression increased "4-fold" in response to a treatment). A feature set may also contain features that represent a "normal state", rather than an indication of change. For example, a feature set may contain a set of genes that have "normal and uniform" expression levels across a majority of human tissues. In this case, the feature set would not necessarily indicate change, but rather a lack thereof.

In certain embodiments, a rank is ascribed to each feature, at least temporarily. This may be simply a measure of relative response within the group of features in the feature set. As an example, the rank may be a measure of the relative difference in expression (up or down regulation) between the features of a control and a test experiment. In certain embodiments, the rank is independent of the absolute value of the feature response. Thus, for example, one feature set may have a feature ranked number two that has a 1.5 fold increase in response, while a different feature set has the same feature ranked number ten that has a 5 fold increase in response to a different stimulus.

Directional feature set—A directional feature set is a feature set that contains information about the direction of change in a feature relative to a control. Bi-directional feature sets, for example, contain information about which features are up-regulated and which features are down-regulated in response to a control. One example of a bi-directional feature set is a gene expression profile that contains information about up and down regulated genes in a particular disease state relative to normal state, or in a treated sample relative to non-treated. As used herein, the terms "up-regulated" and "down-regulated" and similar terms are not limited to gene or protein expression, but include any differential impact or response of a feature. Examples include, but are not limited to, biological impact of chemical compounds or other stimulus as manifested as a change in a feature such as a level of gene expression or a phenotypic characteristic.

Non-directional feature sets contain features without indication of a direction of change of that feature. This includes gene expression, as well as different biological measurements in which some type of biological response is measured. For example, a non-directional feature set may contain genes that are changed in response to a stimulus, without an indication of the direction (up or down) of that change. The non-directional feature set may contain only up-regulated features, only down-regulated features, or both up and down-regulated features, but without indication of the direction of the change, so that all features are considered based on the magnitude of change only.

Feature group—This refers to a group of features (e.g., genes) related to one another. As an example, the members of a feature group may all belong to the same protein pathway in a particular cell or they may share a common function or a common structural feature. A feature group may also group compounds based on their mechanism of action or their structural/binding features.

Index set—The index set is a set in the knowledge base that contains feature identifiers and mapping identifiers and is used to map all features of the feature sets imported to feature sets and feature groups already in the knowledge base. For example, the index set may contain several million feature identifiers pointing to several hundred thousand mapping identifiers. Each mapping identifier (in some instances, also referred to as an address) represents a unique feature, e.g., a unique gene in the mouse genome. In certain embodiments, the index set may contain diverse types of feature identifiers (e.g., genes, genetic regions, etc.), each having a pointer to a unique identifier or address. The index set may be added to or changed as new knowledge is acquired.

Knowledge base—This refers to a collection of data used to analyze and respond to queries. In certain embodiments, it includes one or more feature sets, feature groups, and metadata for organizing the feature sets in a particular hierarchy or directory (e.g., a hierarchy of studies and projects). In addition, a knowledge base may include information correlating feature sets to one another and to feature groups, a list of globally unique terms or identifiers for genes or other features, such as lists of features measured on different platforms (e.g., Affymetrix human HG_U133A chip), total number of features in different organisms, their corresponding transcripts, protein products and their relationships. A knowledge base typically also contains a taxonomy that contains a list of all tags (keywords) for different tissues, disease states, compound types, phenotypes, cells, as well as their relationships. For example, taxonomy defines relationships between cancer and liver cancer, and also contains keywords associated with each of these groups (e.g., a keyword "neoplasm" has the same meaning as "cancer"). Typically, though not necessarily, at least some of the data in the knowledge base is organized in a database.

Curation—Curation is the process of converting raw data to one or more feature sets (or feature groups). In some cases, it greatly reduces the amount of data contained in the raw data from an experiment. It removes the data for features that do not have significance. In certain embodiments, this means that features that do not increase or decrease significantly in expression between the control and test experiments are not included in the feature sets. The process of curation identifies such features and removes them from the raw data. The curation process also identifies relevant clinical questions in the raw data that are used to define feature sets. Curation also provides the feature set in an appropriate standardized format for use in the knowledge base.

Data import—Data import is the process of bringing feature sets and feature groups into a knowledge base or other repository in the system, and is an important operation in building a knowledge base. A user interface may facilitate data input by allowing the user to specify the experiment, its association with a particular study and/or project, and an experimental platform (e.g., an Affymetrix gene chip), and to identify key concepts with which to tag the data. In certain embodiments, data import also includes automated operations of tagging data, as well as mapping the imported data to data already in the system. Subsequent "preprocessing" (after the import) correlates the imported data (e.g., imported feature sets and/or feature groups) to other feature sets and feature groups.

Preprocessing—Preprocessing involves manipulating the feature sets to identify and store statistical relationships between pairs of feature sets in a knowledge base. Preprocessing may also involve identifying and storing statistical relationships between feature sets and feature groups in the knowledge base. In certain embodiments, preprocessing involves correlating a newly imported feature set against other feature sets and against feature groups in the knowledge base. Typically, the statistical relationships are pre-computed and stored for all pairs of different feature sets and all combinations of feature sets and feature groups, although the invention is not limited to this level of complete correlation.

In one embodiment, the statistical correlations are made by using rank-based enrichment statistics. For example, a rank-based iterative algorithm that employs an exact test is used in certain embodiments, although other types of relationships may be employed, such as the magnitude of overlap between feature sets. Other correlation methods known in the art may also be used.

As an example, a new feature set input into the knowledge base is correlated with every other (or at least many) feature sets already in the knowledge base. The correlation compares the new feature set and the feature set under consideration on a feature-by-feature basis by comparing the rank or other information about matching genes. A rank-based iterative algorithm is used in one embodiment to correlate the feature sets. The result of correlating two feature sets is a "score." Scores are stored in the knowledge base and used in responding to queries.

Study/Project/Library—This is a hierarchy of data containers (like a directory) that may be employed in certain embodiments. A study may include one or more feature sets obtained in a focused set of experiments (e.g., experiments related to a particular cardiovascular target). A Project includes one or more Studies (e.g., the entire cardiovascular effort within a company). The library is a collection of all projects in a knowledge base. The end user has flexibility in defining the boundaries between the various levels of the hierarchy.

Tag—A tag associates descriptive information about a feature set with the feature set. This allows for the feature set to be identified as a result when a query specifies or implicates a particular tag. Often clinical parameters are used as tags. Examples of tag categories include tumor stage, patient age, sample phenotypic characteristics and tissue types. Tags may also be referred to as concepts.

Mapping—Mapping takes a feature (e.g., a gene) in a feature set and maps it to a globally unique mapping identifier in the knowledge base. For example, two sets of experimental data used to create two different feature sets may use different names for the same gene. Often herein the knowledge base includes an encompassing list of globally unique mapping identifiers in an index set. Mapping uses the knowledge base's globally unique mapping identifier for the feature to establish a connection between the different feature names or IDs. In certain embodiments, a feature may be mapped to a plurality of globally unique mapping identifiers. In an example, a gene may also be mapped to a globally unique mapping identifier for a particular genetic region. Mapping allows diverse types of information (i.e., different features, from different platforms, data types and organisms) to be associated with each other. There are many ways to map and some of these will be elaborated on below. One involves the search of synonyms of the globally unique names of the genes. Another involves a spatial overlap of the gene sequence. For example, the genomic or chromosomal coordinate of the feature in a feature set may overlap the coordinates of a mapped feature in an index set of the knowledge base. Another type of mapping involves indirect mapping of a gene in the feature set to the gene in the index set. For example, the gene in an experiment may overlap in coordinates with a regulatory sequence in the knowledge base. That regulatory sequence in turn regulates a particular gene. Therefore, by indirect mapping, the experimental sequence is indirectly mapped to that gene in the knowledge base. Yet another form of indirect mapping involves determining the proximity of a gene in the index set to an experimental gene under consideration in the feature set. For example, the experimental feature coordinates may be within 100 basepairs of a knowledge base gene and thereby be mapped to that gene.

Correlation—As an example, a new feature set input into the knowledge base is correlated with every other (or at least many) feature sets already in the knowledge base. The correlation compares the new feature set and the feature set under consideration on a feature-by-feature basis comparing the rank or other information about matching genes. A ranked based running algorithm is used in one embodiment (to correlate the feature sets). The result of correlating two feature sets is a "score." Scores are stored in the knowledge base and used in responding to queries about genes, clinical parameters, drug treatments, etc.

Correlation is also employed to correlate new feature sets against all feature groups in the knowledge base. For example, a feature group representing "growth" genes may be correlated to a feature set representing a drug response, which in turn allows correlation between the drug effect and growth genes to be made.

1. Correlation Scoring of Directional Feature Sets

Aspects of the invention relate to methods of assimilating directional expression-based experimental data so that it may be efficiently navigated and analyzed. In particular, aspects of the invention relate to correlating directional feature sets with other directional feature sets, non-directional feature sets and feature groups. As indicated above, a directional feature set is a data set that includes one or more features and associated information about experimental impact on or response to those features, including the direction of the impact or response. One framework for the methods described herein is described below and in U.S. patent application Ser. No. 11/651,539, published as U.S. Patent Publication 20070162411, in which data is imported into a knowledge base of diverse types of biological, chemical and/or medical information. Correlation scoring, or pre-processing, is performed after the data has been imported and involves correlating the imported data with pre-existing data in the knowledge base. All new data imported into the system is pre-processed—correlations are typically pre-computed across the entire information space. In certain embodiments, the methods described are not limited to this framework, but may be used to correlate any experimental data that includes directional information with other biological, chemical and medical information.

Examples of directional feature sets include gene expression signatures of diseases and compounds. The methods described herein provide correlation scores indicating the degree of correlation between feature sets as well as a correlation direction. As a result, a researcher searching for compounds that are negatively correlated to a particular disease may query numerous compounds against a disease of interest and be presented with a list of those that are negatively correlated with the disease. To perform a similar analysis without directional feature set correlation scoring, one would have to both query up-regulated gene expression of the disease and down-regulated gene expression of the disease against the set of compound feature sets independently, obtaining a list compounds that correlate to the up-regulated features and a separate list of compounds that correlate to the down-regulated features. The user would then have to manually assimilate the information to find compounds that demonstrate signatures of up-regulation of genes that are down-regulated in cancer cells, and down-regulation of genes that are up-regulated in cancer cells. Moreover, the processes described herein provide a researcher with information that might otherwise be lost without using correlation scoring that does not distinguish between up and down-regulated features.

In certain embodiments, the features sets contain a ranked list of features. Ranking involves ordering features within each feature set based on their relative levels of response to the stimulus or treatment in the experiment(s), their magnitude of change between different phenotypes, etc. Ranking is typically based on one or more associated statistics in an imported feature set; for example, features may be ranked in order of decreasing fold-change or increasing p-value. This ranking system ensures that features from feature sets that use different statistics can still be compared based on their relative order or rankings across feature sets. Ranking in a bi-directional feature set are typically based on the magnitude of change relative to control, i.e., up-regulated and down-regulated features are ranked together based on the magnitude of the change from control.

In addition to ranks, in certain embodiments, mapping identifiers are associated with each feature in a feature set. Mapping is the process through which diverse features (e.g., from different platforms, data types and organisms) are associated with each other. For example, a gene may be associated with a SNP, a protein, or a sequence region of interest. In certain embodiments, e.g., if correlating feature sets having data from a common platform, mapping may not be necessary. Examples of methods of mapping are described further below. The mapping methods described below and in U.S. Patent Publication 20070162411 enable data to be connected across assay types, organisms and platforms. Both ranking and mapping are determined prior to the correlation process. Once mapping is determined, correlation algorithms may be applied automatically and systematically to pre-compute correlation scores (e.g., p-values and/or derivative rank scores) between a given set of data and any other biological, clinical, or chemical entities within the knowledge base.

FIG. 1A shows a representation of various elements in a knowledge base of scientific information. Examples of generation of or addition to some of these elements (e.g., feature sets and a feature set scoring table) are discussed in the further below and in U.S. Patent Publication No. 20070162411 and U.S. Provisional Patent Applications 61/033,673 and 61/089,834, incorporated by reference herein. The knowledge base may also include other elements as discussed in the U.S. Patent Publication No. 20070162411, such as an index set, which is used to map features during a data import process. In FIG. 1A, element 104 indicates all the feature sets in the knowledge base. After data importation, the feature sets typically contain at least a feature set name and a feature table. The feature table contains a list of features, each of which is usually identified by an imported identifier and/or a feature identifier. Each feature has a normalized rank in the feature set, as well as a mapping identifier. Mapping identifiers and ranks are determined during the import process as described further below, and then may be used to generate correlation scores between any two feature sets and between feature sets and feature groups. The feature table also typically contains statistics associated with each feature, e.g., p-values and/or fold-changes. One or more of these statistics can be used to calculate the rank of each feature. In certain embodiments, the ranks may be normalized. In the case of a bi-directional feature set, a direction of correlation for some or all features is also indicated. A feature set may also contain an associated study name and/or a list of tags. Feature sets may be generated from data taken from public or internal sources.

Element 106 indicates all the feature groups in the knowledge base. Feature groups contain a feature group name, and a list of features (e.g., genes) related to one another. A feature group typically represents a well-defined set of features generally from public resources—e.g., a canonical signaling pathway, a protein family, etc. Unlike feature sets, the feature groups do not typically have associated statistics or ranks. The feature sets may also contain an associated study name and/or a list of tags.

Element 108 indicates a scoring table, which contains a measure of correlation between each feature set and each of the other feature sets and between each feature set and each feature group. In the figure, $FS_1$-$FS_2$ is a measure of correlation between feature set 1 and feature set 2, $FS_1$-$FG_1$ a measure of correlation between feature set 1 and feature group 1, etc. In certain embodiments, the measures are p-values or rank scores derived from p-values.

Element 110 is a taxonomy or ontology that contains tags or scientific terms for different tissues, disease states, compound types, phenotypes, cells, and other standard biological, chemical or medical concepts as well as their relationships. The tags are typically organized into a hierarchical structure as schematically shown in the figure. An example of such a structure is Diseases/Classes of Diseases/Specific Diseases in each Class. The knowledge base may also contain a list of all feature sets and feature groups associated with each tag. The tags and the categories and sub-categories in the hierarchical structure are arranged in may be referred to as concepts.

In certain embodiments, the knowledge base also contains a concept scoring table or tables, such as shown in element 112, which contains scores indicating the relevance of each concept or correlation of each concept with the other information in the database, such as features, feature sets and feature groups. In the embodiment depicted in FIG. 1, scores indicating the relevance of each concept in the taxonomy to each feature are shown at 114, scores indicating the relevance of each concept in the taxonomy to each feature set are shown at 116 and scores indicating the relevance of each concept in the taxonomy to each feature group are shown at 118. (As with the other elements represented in FIG. 1, the organizational structure of the concept scoring is an example; other structures may also be used to store or present the scoring.) In the figure, $F_1$-$C_1$ is a measure of relevance of Concept 1 to Feature 1, $FS_1$-$C_1$ a measure of relevance to Concept 1 to feature set 1; and $FG_1$-$C_1$ a measure of relevance to Concept 1 to feature group 1, etc. In certain embodiments, the concept scoring table includes information about the relevance or correlation of at least some concepts with each of all or a plurality of other concepts. Concept scoring is described in particular detail in U.S. Provisional Patent Applications 61/033,673 and 61/089,834, referenced above. In certain embodiments, the feature set to feature set and feature set to feature group correlation scoring described is used in concept scoring and to present a user with a list of the most relevant concepts in response to a query. The feature set to feature set and feature set to feature group correlation scoring may also be used to present user with lists of ranked features, feature sets or feature groups in response to a query.

An example of a feature table of a directional feature set is shown in FIG. 1B. In this example, the features are genes, with their common names indicated in column 115. Imported feature identifiers are indicated in column 119 and mapping identifiers are indicated in column 117. The associated statistics, in this case fold change, are indicated in column 111. Direction of fold change is indicated at 113. Direction of change may be indicated in any suitable manner. Ranks are indicated in column 121, in this case corresponding to the magnitude of fold change shown in column 111. As can be seen, the feature rankings in FIG. 1B are based on fold change, without regard to the direction of change.

In many embodiments, preprocessing uses feature rankings to correlate feature sets. Thus, prior to computing a correlation score, the features in a feature set are ranked based on the p-value, fold change, or any other meaningful measurement or statistic contained in the feature table. The rank is based on the absolute value of the feature statistics in a given feature set. Thus, for example, one feature set may have a feature ranked number two that has a 1.5 fold increase in response, while a different feature set has the same feature ranked number ten that has a 5 fold increase in response to a different stimulus. As indicated, above ranking is typically performed during data import.

A. Correlation Scoring between Bi-Directional Feature Sets

Figure 2:
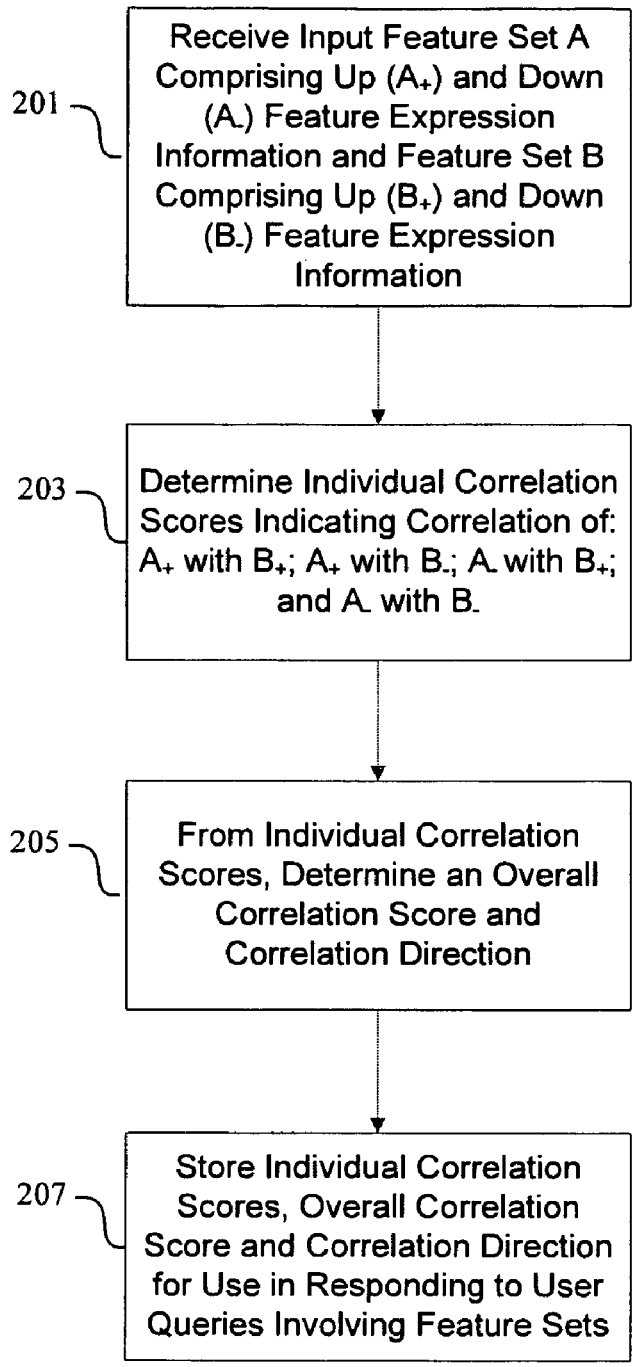
FIG. 2 is a flow diagram presenting steps in correlating two bi-directional feature sets, A and B.
Figure 4A:
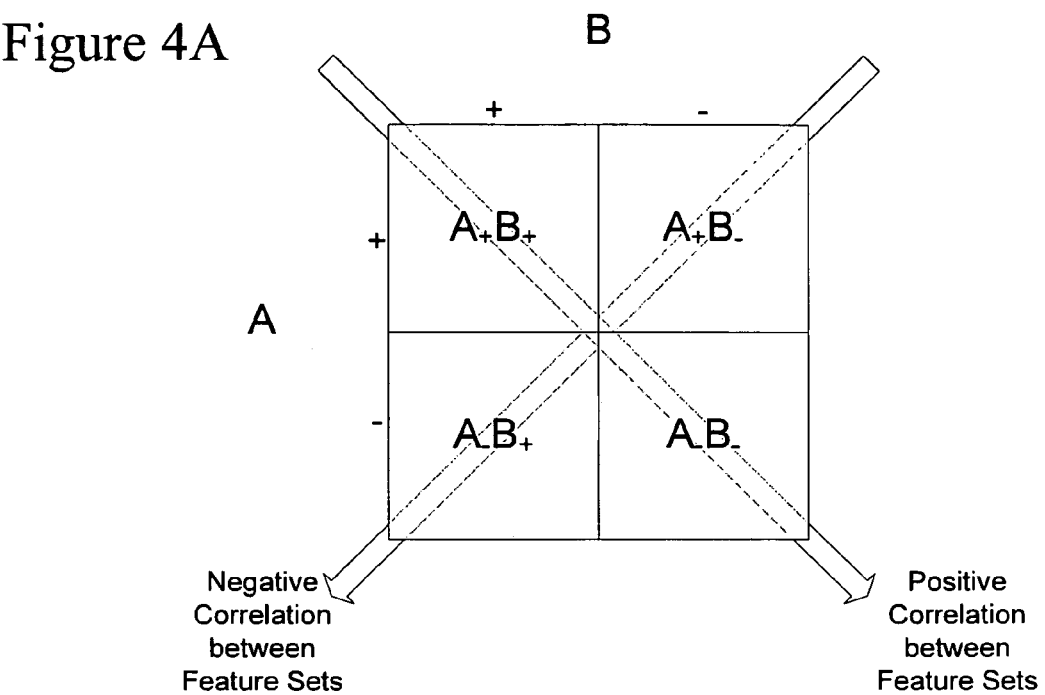
FIG. 4A shows a representation of four individual correlation scores: $A_+B_+$, $A_+B_-$, $A_-B_-$, and $A_-B_+$, determined to determine an overall correlation score between two bi-directional feature sets, A and B.

FIG. 2 is a process flow sheet that shows an overview of correlation scoring between two bi-directional feature sets, A and B. A has up-expressed features $A_+$ and down-expressed features $A_-$; B has up-expressed features $B_+$ and down-expressed features $B_-$. The process begins at an operation 201 in which feature set A and feature set B are received. In the example presented in FIG. 2, feature set A is an input feature set, for example, provided by a user and feature set B is a pre-existing feature set in the knowledge base. In an operation 203, individual correlation scores are determined indicating the correlation between: $A_+$ and $B_+$ (the up-expressed features of A and the up-expressed features of B); $A_-$ and $B_-$ (the down-expressed features of A and the down-expressed features of B); $A_+$ and $B_-$ (the up-expressed features of A and the down-expressed features of B); and $A_-$ and $B_+$ (the down-expressed features of A and the up-expressed features of B). As discussed further below with reference to FIGS. 6 and 11A, in certain embodiments, correlation scoring is performed using feature ranks and rank-based iterative scoring algorithms. At this point there are four correlation scores: $A_+B_+$, $A_+B_-$, $A_-B_-$, and $A_-B_+$. FIG. 4A shows a representation of the four scores. As shown in the figure, $A_+B_+$ and $A_-B_-$ are measures of positive correlation between A and B: a large $A_+B_+$ indicates a high correlation between features up-expressed in A and up-expressed in B; a large $A_-B_-$ indicates a high correlation between features down-expressed in A and those down-expressed B. Similarly $A_+B_-$ and $A_-B_+$ are measures of negative correlation between A and B: a large $A_+B_-$ indicates a high correlation between features up-expressed in A and those down-expressed in B and large $A_-B_+$ indicates a high correlation between features down-expressed in A and features up-expressed in B.

Returning to FIG. 2, from the individual correlation scores, an overall correlation score and a correlation direction are determined in an operation 205. Determining a correlation direction and an overall score may involve comparing the individual scores indicating a positive correlation ($A_+B_+$ and $A_-B_-$) with those that indicate a negative correlation ($A_+B_-$ and $A_-B_+$). In certain embodiments, determining an overall correlation score and correlation direction involves adding the scores together, with the scores indicating a negative correlation given a negative sign in the correlation score expression. The overall correlation score is the absolute value of the expression and the correlation direction is determined by the sign (positive or negative):

Overall correlation score: $|A_+B_+ + (-A_+B_-) + A_-B_- + (-A_-B_+)|$

Other methods of determining an overall correlation score and correlation direction based on the individual scores may be used. For example, $|A_+B_+ + A_+B_- + A_-B_- + A_-B_+|$ may be used, with correlation direction calculated as described above. In another embodiment, the maximum of $|A_+B_+ + A_-B_-|$ and $|A_+B_- + A_-B_+|$ is used. Correlation direction: positive or negative depending on sign of $A_+B_+ + (-A_+B_-) + A_-B_- + (-A_-B_+)$ expression Other methods of determining an overall correlation score and correlation direction based on the individual scores may be used. The overall correlation score and correlation direction are stored in an operation 207 for use in responding to user queries. The individual correlation scores are typically also stored, e.g., to be presented to a user who wishes to see detail on a particular feature set returned in result to a query.

Figure 3:
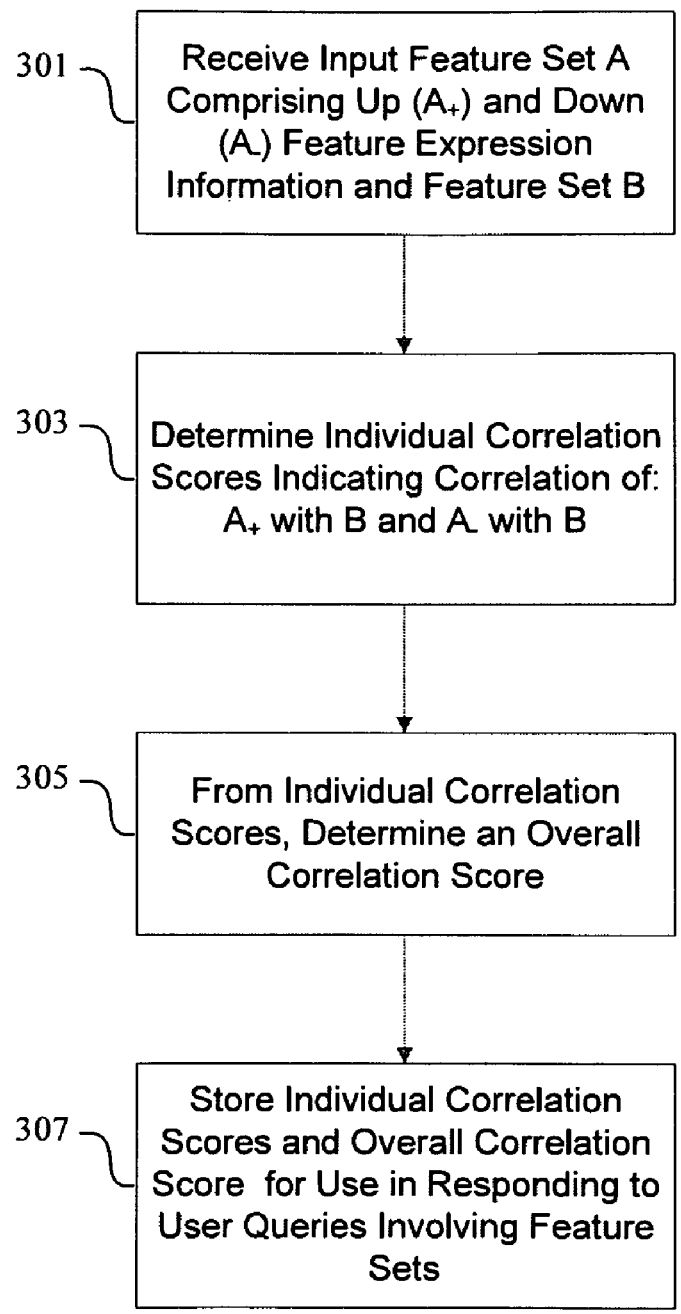
FIG. 3 is a flow diagram presenting steps in correlating a bi-directional feature set A with a non-directional feature set B.
Figure 4B:
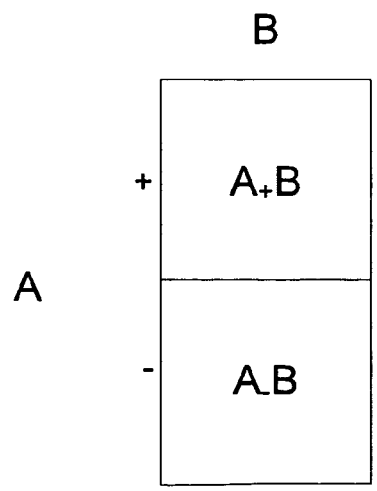
FIG. 4B shows a representation of the two individual correlation scores, $A_+B$ and $A_-B$, determined to determine an overall correlation score between a bi-directional feature set A and a non-directional feature set B.

B. Correlation Scoring of Directional Features Sets with Non-Directional Feature Sets Directional feature sets are also correlated with non-directional feature sets and feature groups. Non-directional feature sets contain features that do not have a particular direction associated with the change. An example of a non-directional feature set is one that contains a set of genes that have normal and uniform expression levels across a majority of human tissues. FIG. 3 is a process flow sheet showing operations in correlating a bi-directional feature set A with a non-directional feature set B. First, in an operation 301, bi-directional feature set A containing up and down-expressed features and associated statistics, and feature set B are received. Feature set B is a non-directional feature set. Then, in an operation 303, individual correlation scores indicating the correlation of the up-regulated features of A and all features B and the correlation of the down-regulated features of A and all features of B are determined. FIG. 4b shows a representation of the two individual scores, $A_+$ and $A_-B$, that are determined. From the two individual scores, an overall or final score is determined in an operation 305. Typically this operation involves selecting the score indicating a higher correlation. The individual scores and the overall score are then stored for use in responding to user queries in an operation 307. The flow sheet in FIG. 3 also applies to correlating bi-directional feature sets with uni-directional feature sets, i.e., feature sets that have only up-expressed or only down-expressed features. (An alternative approach is to treat uni-directional feature sets as in FIG. 4A with Score=$|A_+B_+ + (-A_+B_-) + (-A_-B_- + (-A_-B_+)|$ with $A_+B_- + A_-B_-$ (in the case of B having only up-regulated features) both equal to zero.

C. Correlation Scoring of Directional Feature Sets with Feature Groups

Figure 5:
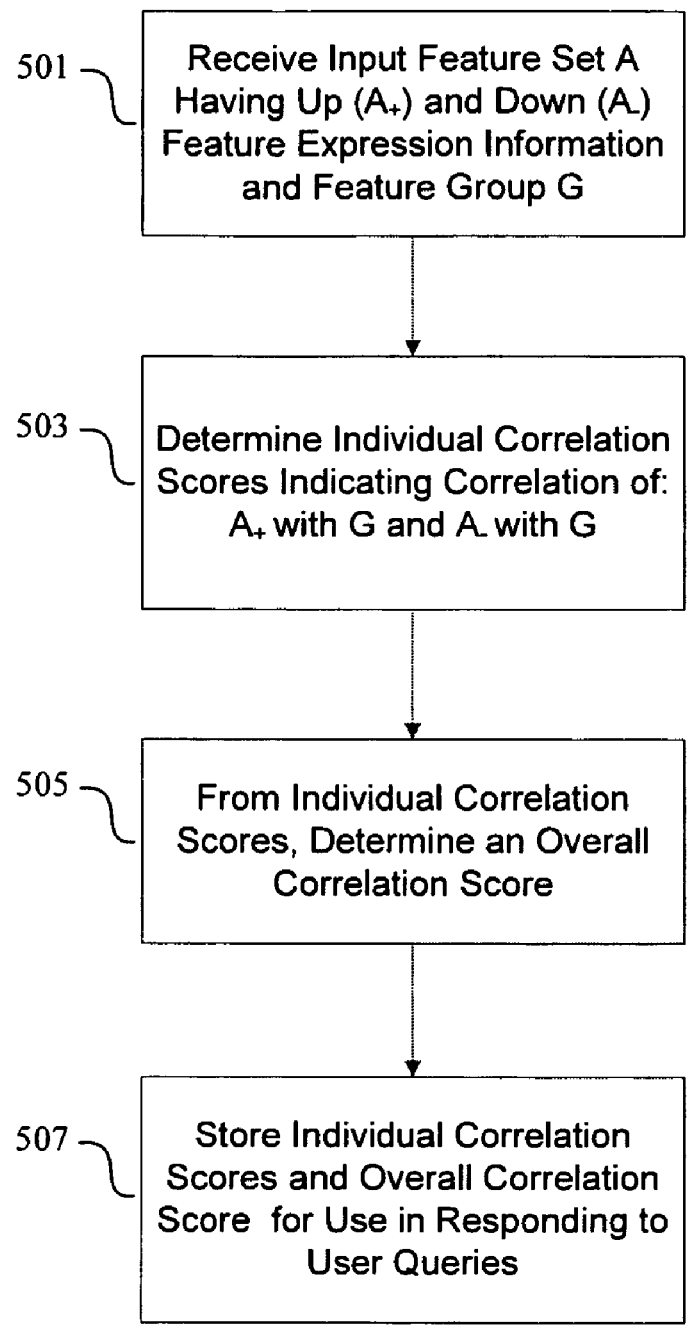
FIG. 5 is a flow diagram presenting steps in correlating a bi-directional feature set A with a feature group G.

Bi-directional feature sets are also correlated with feature groups. As discussed above, feature groups have collections of features having structural and/or functional characteristics in common. Correlation of a bi-directional feature set with feature group is typically performed by determining individual correlation scores, one indicating the correlation between the up-regulated features of the bi-directional feature set with all features in the feature group and one indicating the correlation between the down-regulated features of the bi-directional feature set and the features in the feature group. The highest correlation score is then presented as a default score. A more detailed view, e.g., in a matrix, however, can provide information about correlations between a feature group and both directions of a feature set. An overview of the process is shown in FIG. 5. First an input bi-directional feature set A, having up ($A_+$) and down ($A_-$) feature expression information, and a feature group G are received in an operation 501. Individual correlation scores indicating the correlation of the up-regulated features $A_-$ with the feature group G and the down-regulated features $A_-$ with the feature group G are determined in an operation 503. This may be performed by a rank based algorithm as described below. An overall correlation score in then determined in an operation 505, e.g., by averaging the correlation scores, selecting the score that gives the higher correlation, etc. The individual correlation scores and the overall correlation scores are then stored in an operation 507 for use in responding to user queries.

Non-directional feature sets are also correlated with feature groups. In those cases, only one score is determined for the correlation of the whole feature set with each feature group. Similarly, one score may also be determined for the correlation of a unidirectional feature set with a feature group.

The importation and correlation of directional feature sets as described above provides users with the ability to perform complex queries efficiently. In an example, a user wishes to query a cancer signature feature set against multiple drug compound feature sets to identify possible compounds effective against the disease. For example, a feature set to be queried shows up- and down-regulated gene expression in human breast cancer cells, and feature sets to be queried against show up- and down-regulated gene expression in response to Compound A; up- and down-regulated gene expression in response to Compound B; up- and down-regulated gene expression in response to Compound C, etc.

By using the pre-computed correlation scores, a ranked list of compound feature sets can be returned in response to the query, ranked according to correlation score. The correlation direction (positive or negative) of the ranked feature sets with the queried feature set are also shown. In this case, a negative correlation is desired to find a compound that has the opposite effect of the cancer. The user can expand a compound feature set having a negative correlation to see the details of the individual correlations, e.g., the correlation between the genes up-regulated in cancer cells and genes down-regulated in response to the compound, etc.

To perform a similar analysis without the use and correlation of bi-directional feature sets, one may have to query two unidirectional feature sets (up-regulated gene expression in human breast cancer cells and down-regulated gene expression in human breast cancer cells) against the set of compound feature sets independently, obtaining a ranked list of compounds that correlate to the up-regulated features and a ranked list of compounds that correlate to the down-regulated features. The user would then have to manually assimilate the information to find compounds that demonstrate signatures of both up-regulate genes that are down-regulated in cancer cells, and down-regulate genes that are up-regulated in cancer cells.

Moreover, the processes described herein capture information that would be lost using correlation scoring that does not distinguish between up and down-regulated features. In one example, referring back to FIG. 4B, in correlating a bi-directional feature set A with a non-directional feature set B, the better of the $A_+B$ and $A_-B$ correlation scores is selected. Correlating the up- and down-regulated features of A together with B might result in a low correlation of the down-regulated features of A with B, for example, canceling out or obscuring a high correlation of the up-regulated features of A with B. This is also true for correlation of bi-directional feature sets with bi-directional feature sets.

D. Feature Set to Feature Group Correlation Scoring

In certain embodiments of the invention, rank-based enrichment algorithms, which take into account feature rankings, are used. Also as indicated above, Fisher's exact test may be used to measure the significance of association of two variables. (See, Fisher, R. A. (1922). "On the interpretation of $\chi^2$ from contingency tables, and the calculation of P". Journal of the Royal Statistical Society 85(1):87-94, which is hereby incorporated by reference for all purposes). In embodiments of the invention, Fisher's exact test is used to measure the significance of the overlap of features in a given feature set B with features in a given feature group C. It should be noted that for directional feature sets, B may be either $B_+$ or $B_-$. For ease of discussion, the below discussion refers only to feature sets B, $F_1$, $F_2$, etc., but it should be understood that in determining the individual correlation scores as described above, a feature set B may be $B_+$ or $B_-$ depending on the individual score being determined.

Figure 8:
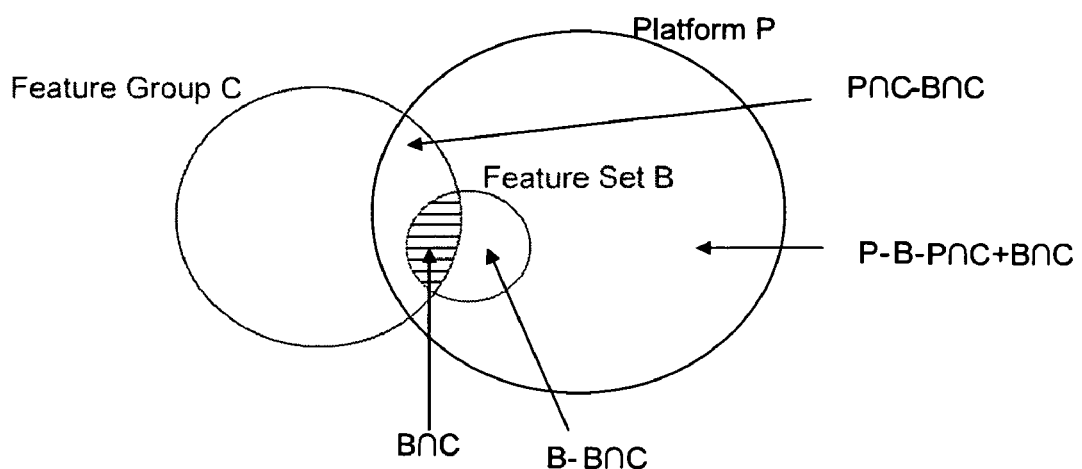
FIG. 8 is a set diagram showing an example of a feature set versus feature group relationship.

FIG. 8 is a feature set versus feature group set diagram. P represents all features in the experimental platform (e.g., all genes that a microarray test measures expression of or all features in the raw data); B represents the features in the feature set; and C represents the features in the feature group. The table below the set diagram shows the sets indicated on the diagram. In applying Fisher's exact test in any situation, it is necessary to define four parameters or elements of the contingency table that will give meaningful results. The elements of the contingency table used in Fisher's exact test in accordance with embodiments of the invention are highlighted in the table in FIG. 8. These elements are:

B∩C is the intersect of feature set B and feature group C, and is shown as the striped subset in the diagram. This represents features in B that are mapped to features in C.

P∩C-B∩C represents the features in P that are mapped to C, but are not in B, and is indicated on the diagram;

B-B∩C represents the features in B that are not mapped to features in C and is indicated on the diagram;

P-B-P∩C+P∩C represents the features in P that are neither in B nor mapped to features in C. This subset is also indicated on the diagram.

Applying Fisher's exact test, a p-value is obtained. The implementation of Fisher's exact test is based on Agresti A, (1992), A Survey of Exact Inference for Contingency Tables, *Statistical Science,* 7, 131-153, hereby incorporated by reference.

Figure 9A:
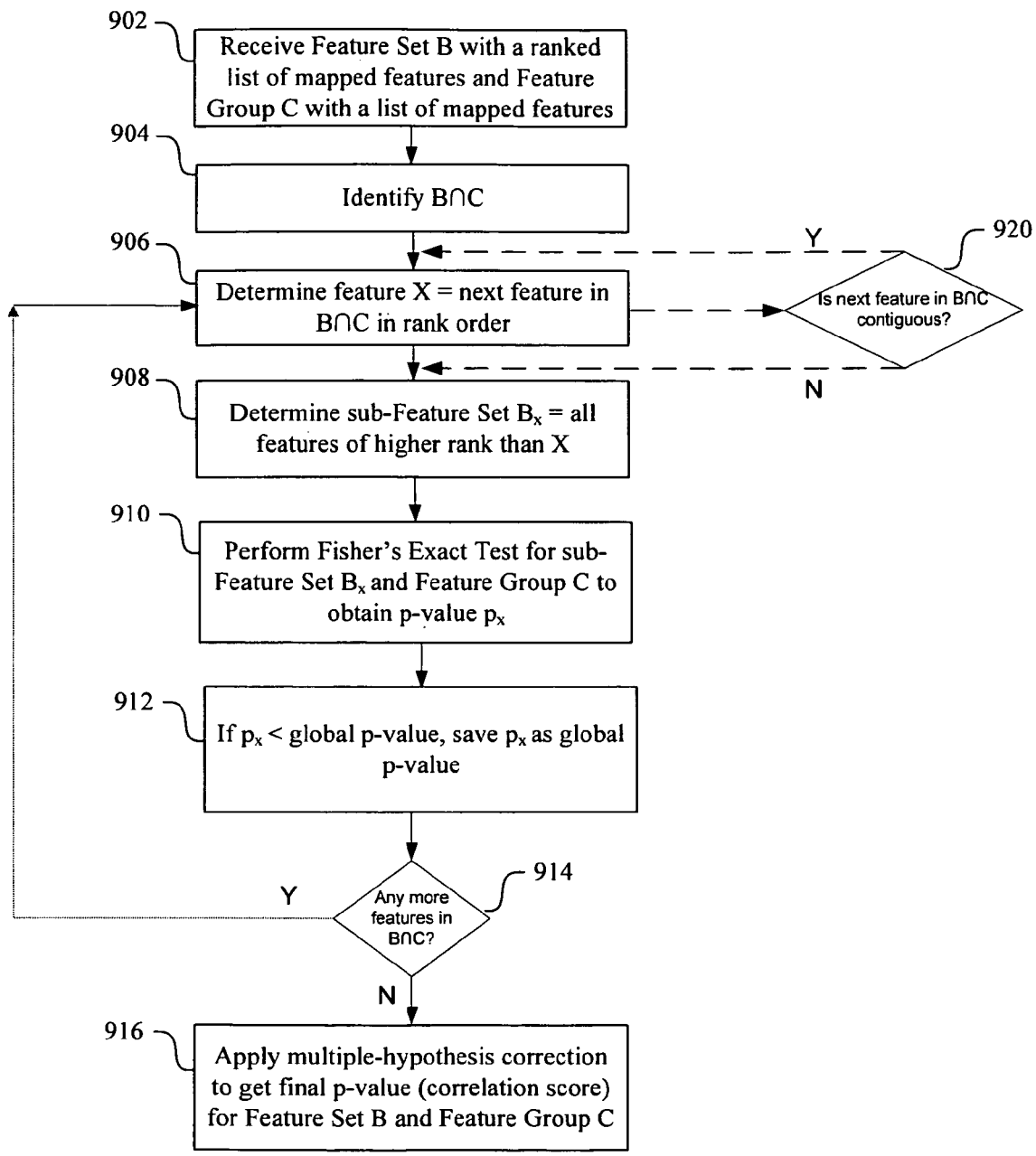
FIG. 9A is a flow diagram presenting key steps in correlating a feature set to a feature group.

FIG. 9A is a process flow diagram showing key operations in generating a correlation score indicating the correlation between a feature set B and feature group C. This 'running' algorithm can be described as iterations of the Fisher's exact test at dynamic checkpoints. The process begins with receiving feature set B and feature group C (902). The features in the feature set have been ordered by rank, as discussed above. An example of a feature set feature table with rankings is shown in FIG. 9B. The rank is shown in column 952. The file also contains mapping identifiers in column 956. In the example shown in FIG. 9B the feature table also contains an imported ID column (954) displaying the feature identifiers as received during data import; a symbol column (958) displaying symbols associated with the features; a p-value column (960) displaying p-values as measured in the experiment; and a fold-change column (962) displaying fold changes as measured in the experiment. The rankings shown in column 952 are based on fold-change; however they may also be based on p-value, other appropriate statistics or a combination thereof. The feature group C also contains a list of feature identifiers and mapping identifiers, however, it typically does not contain rankings or other statistics. Common mapping identifiers allow determination of the members of the B∩C subset in an operation 904 shown in FIG. 9A. The highlighted rows in FIG. 9B indicate the features that are members of the B∩C subset. After receiving the feature set B and feature group C, feature X is determined (906). Feature X is the next feature in B∩C in rank order. Thus, for the first iteration of the process as applied to the feature set shown in FIG. 9B, Feature X is the feature ranked 11, which is indicated at Stop 1 in column 964. This is the first checkpoint. Returning to FIG. 9A, a sub-feature set $B_x$ is determined (908). (Decision diamond 920 indicates an optimization step that is discussed further below). Sub-feature set $B_x$ is the set of all features having a rank equal to or higher than X. So, for the first iteration, sub-feature set $B_x$ contains the features ranked 1-11. Fisher's exact test is then performed for sub-feature set $B_x$ and feature group C in an operation 910, using the parameters described above (i.e., $B_x \cap C$, $P \cap C-B_x \cap C$, etc.). The resulting p-value, $p_x$ is then compared to a global p-value, and if it is less than the global p-value, it is saved as the (new) global p-value. For the first iteration, where there is no pre-existing global p-value, $p_x$ is saved as the global p-value with which to be compared in the successive iteration. Note that for the first iteration, $B_x \cap C$ has one member, with every successive iteration adding a member. Decision 914 then determines if there are any remaining features in B∩C. If there are, the process returns to operation 906, in which feature X is identified. For example, for the second process iteration of the feature set shown in FIG. 9B, feature X is the feature ranked 13, and sub-feature set $B_x$ contains features ranked 1-13.

Essentially, the process looks at all possible p-values for all sub-feature sets $B_x$ and selects the lowest p-value. It should be noted that performing Fisher's exact test only at the "stop" points indicated returns the same result as if it were performed at each ranked feature. This is because the p-values from Fisher's exact test performed at all non-stop points will be higher than the global p-value (with P and C remaining constant, the p-value for B=y and B∩C=z is less than that for B=y+1 and B∩Cc=z).

Once there are no remaining features in B∩C, a multiple-hypothesis testing correction is applied to the global p-value to obtain a final p-value for feature set B and feature group C (916). The p-value is multiplied by the size of the feature set. This correction accounts for the fact that larger feature sets return lower p-values, as there are more opportunities for lower p-values to be received with larger feature sets. Multiple-hypothesis testing corrections are known in the art. This final p-value is then stored, e.g., in a Scoring Table. In certain embodiments, a 'rank score' is stored in the Scoring Table in addition to or instead of the final p-value. Briefly, the rank score is a derivative of the final p-value and is the negative logarithm of the p-value.

To improve computational efficiency, various optimizations may be implemented. One optimization is described above, in which Fisher's exact test is performed only for sub-feature sets at "stop" points, as p-values calculated using other sub-feature sets will not return lower p-values. Another optimization may be performed by checking to see if the next feature in B∩C is contiguous. This is shown in decision 920 of FIG. 9A. Contiguous features are those next to each other in ranked order. If the next overlapping feature is contiguous, the calculation at feature X may be skipped, and the process returns to operation 904, wherein the feature X is determined, which in this case is just the next feature. For example, referring to FIG. 9B, when the process is at checkpoint 'stop 3' at the feature ranked 17, the next feature in B∩C (the feature ranked 18) is contiguous. The calculation at 'stop 3' is skipped, and Fisher's exact test is then performed at 'stop 4.' This is because under these conditions (the next stop is contiguous), the returned p-value will be lower for the higher ranked feature.

ii. Feature Set to Feature Set Correlation Scoring

The algorithm discussed above with respect to FIGS. 9A and 9B takes into account the feature set rankings of the overlapped features in calculating a p-value indicating the correlation between feature set A and feature group B. Similarly, a 'running' algorithm employing Fisher's exact test iteratively is used to calculate a p-value indicating the correlation between two feature sets F1 and F2. The feature set versus feature set case is significantly more complex, however, as it takes into account two sets of rankings—those in feature set F1 and those in feature set F2.

Figure 10:
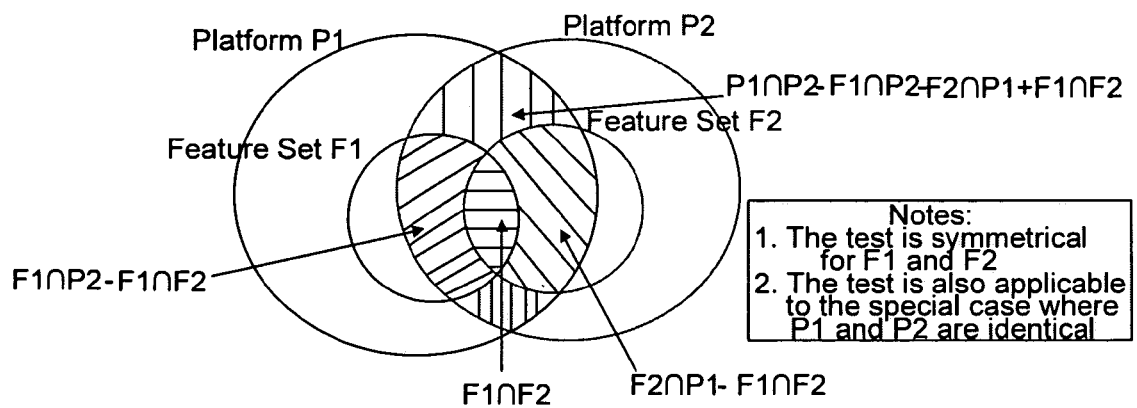
FIG. 10 is a set diagram showing an example of a feature set versus feature set relationship.

FIG. 10 is a feature set (F1) versus feature set (F2) set diagram, and table showing the elements or parameters to be used in Fisher's exact test measuring the significance of the overlap of the feature sets. These are:

F1∩F2 is the intersect of feature set F1 and feature set F2, and is indicated in the diagram. This represents features in F1 that are mapped to features in F2;

F1∩P2-F1∩F2 represents the features in the intersect of P1 and P2 that are in F1, but are not in F2;

F2∩P1-F1∩F2 represents the features in the intersect of P1 and P2 that are in F2, but are not in F1;

P1∩P2-F1∩P2-F2∩P1+F1∩F2 represents the features in the intersect of P1 and P2 that are neither in F1 or F2.

Figure 11A:
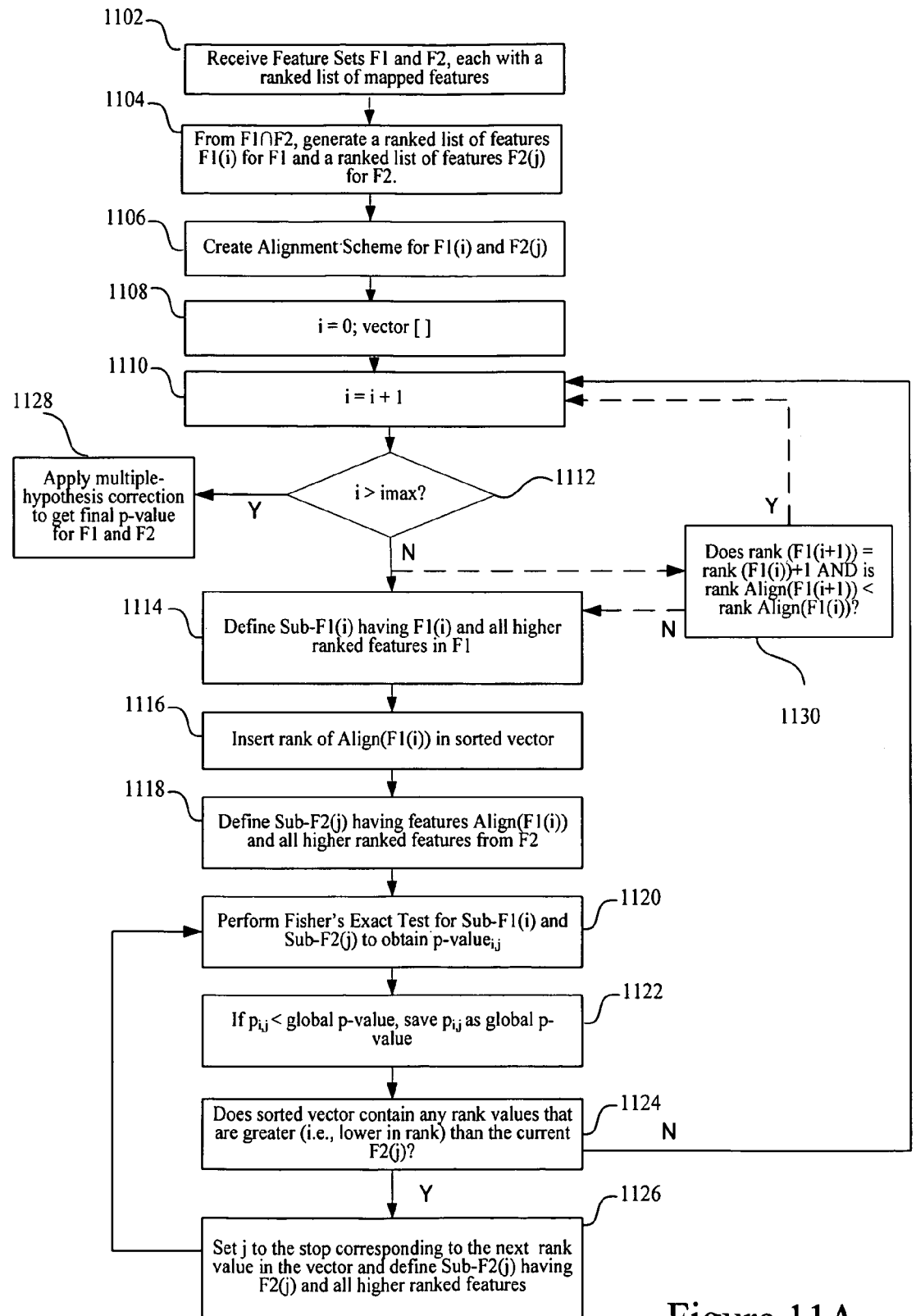
FIG. 11A is a flow diagram presenting key steps in correlating a feature set to another feature set.

FIG. 11A is a process flow diagram showing key operations in generating a correlation score indicating the correlation between feature sets F1 and F2. First, in an operation 1102, feature sets F1 and F2 are received, each with a ranked list of mapped features, e.g., as shown for one feature set in FIG. 9B. The intersect F1∩F2 is determined using the mapping identifiers. From F1∩F2, a ranked list of features F1(i) and F2(j) are generated.

The variables "i" and "j" are used to designate stops or checkpoints of F1 and F2, respectively. As in the feature set to feature group running algorithm described above, stops are used to define sub-feature sets for which to generate p-values, the lowest of which is the final p-value for the feature set to feature set comparison. In a brute force method, Fisher's exact test would be performed for all combinations of sub-F1 (i) Sets and all possible sub-F2(j) sets. However, this is not necessary, as reflected in the algorithm below. All i=1 to i=imax stops in F1(i) are indexed over in an outer loop. The inner loop, however, does not index over all possible values of j, but determines what sub-F2 Sets to use based on a sorted vector. In this sense, "j" indicates the current stop of F2 being used to define the sub-F2 Set, from which a p-value $p_{i,j}$ is calculated.

Note that though the features in F1(i) and F2(j) are the same (i.e., all overlapping features from F1 and F2), the ranked lists are different as the F1 and F2 have different rankings. FIG. 11B shows an example of ranked lists of F1 and F2 (for ease of description, only the rankings are shown; however as in FIG. 9B, the tables may also include feature identifiers, mapping addresses, statistics, etc.). The highlighted ranks in each feature set indicate the members of F1∩F2. Thus, F1(1)=the F1 feature ranked 1st; F1(2)=the F1 feature ranked 5th; F2(1)= the F2 feature ranked 2nd, F2(2)=the F2 feature ranked 7th, etc.

F1(i) and F2(j) are then 'aligned,' i.e., each feature F1(i) is connected to or associated with its corresponding feature F2(j) (1106). This is graphically depicted in FIG. 11C, in which the F1(1) is aligned with F2(3); F1(2) is aligned with F2(2); F1(3) is aligned with F2(4), etc. The nomenclature Align(F1(i)) is used in the flow sheet and in the following description to refer to the feature in F2(j) that F1(i) is aligned to; for example, Align(F1(3)) refers to F2(4). Similarly Align (F2(3)) refers to F1(1). A counter i is set to zero (1108). Operation 1108 also indicates that a sorted vector used later in the algorithm to determine sub-F2 Sets is empty at this point. Counter i is indexed (i=i+1) at an operation 1110. Counter i is compared to imax, where imax is the number of features in F1(i) (1112). If it is less than or equal to imax, the process proceeds to an operation 1114, in which a sub-feature set sub-F1(i) is defined. (Operation 1130 is an optimization step that is discussed further below). Sub-F1(i) contains F1(i) and all higher ranked features in F1. So, for example in the example presented in FIG. 11C, sub-F1(1) contains only F1(1) as it is the highest ranked feature. The rank of F1(2) is 5, so sub-F1(2) would contain the features in F1 that are ranked 1-5. The rank of Align(F1(i)) is then inserted into the vector (1116). For F1(1), the vector would be [13]; for F1(2), the vector would be [2,13], etc. The process then defines a sub-feature set sub-F2(j) in an operation 1118. Sub-F2(j) contains Align(F1(i)) and all higher ranked features in F2. For i=1, Align(F1(1))=F2(3). The rank of F2(3) is 13, so sub-F2(j) contains the features in F2 ranked 1-13. Fisher's exact test is then performed for sub-F1(i) and sub-F2(j) using the parameters described above with respect to FIG. 10 to generate a p-value $p_{i,j}$ (1120). The p-value $p_{i,j}$ is then compared to the global p-value and saved as the global p-value if it is lower (1122). Determining if the current sub-F1(i) should be compared to other sub-F2 sets involves checking if the sorted vector contains any rank values that are higher (i.e., lower in rank) than the rank of the current F2(j) (1124). If it does, j is set to the stop corresponding to the next rank value in the vector and a new sub-F2(j) containing F2(j) and all higher-ranked features in F2 is defined (1126). For example, for the first iteration of the inner loop for i=2 in the example shown in FIG. 11C, j=1 (Align(F1(2))=F2(1)). The rank of F2(1) is 2, so the vector contains [2,13]. First a p-value $p_{2,1}$ is calculated. Then the vector is checked to see if contains any ranked values that are greater (lower in rank) than the rank of 2. It does as 13 is greater than 2 (also stated as 13 is lower in rank than 2). A new sub-F2(j) is created using the F2 stop corresponding to rank 13 as the new j; in this case sub-F2(3) is created, containing the F2 features ranked 1-13. The process then returns to operation 1120, in which Fisher's exact test is performed for F1(i) and the new F2(j). Returning to operation 1124, if there are no rank values greater than the rank of current F2(j), the process returns to operation 1110 to calculate p-values for the next F1 stop. Once all F1 stops have been run through and i>imax, a multiple hypothesis testing correction is applied (1128). This correction is based on the total number of possible hypothesis tests, i.e., all possible combinations of F1 and F2 sub-feature sets.

Figure 11C:
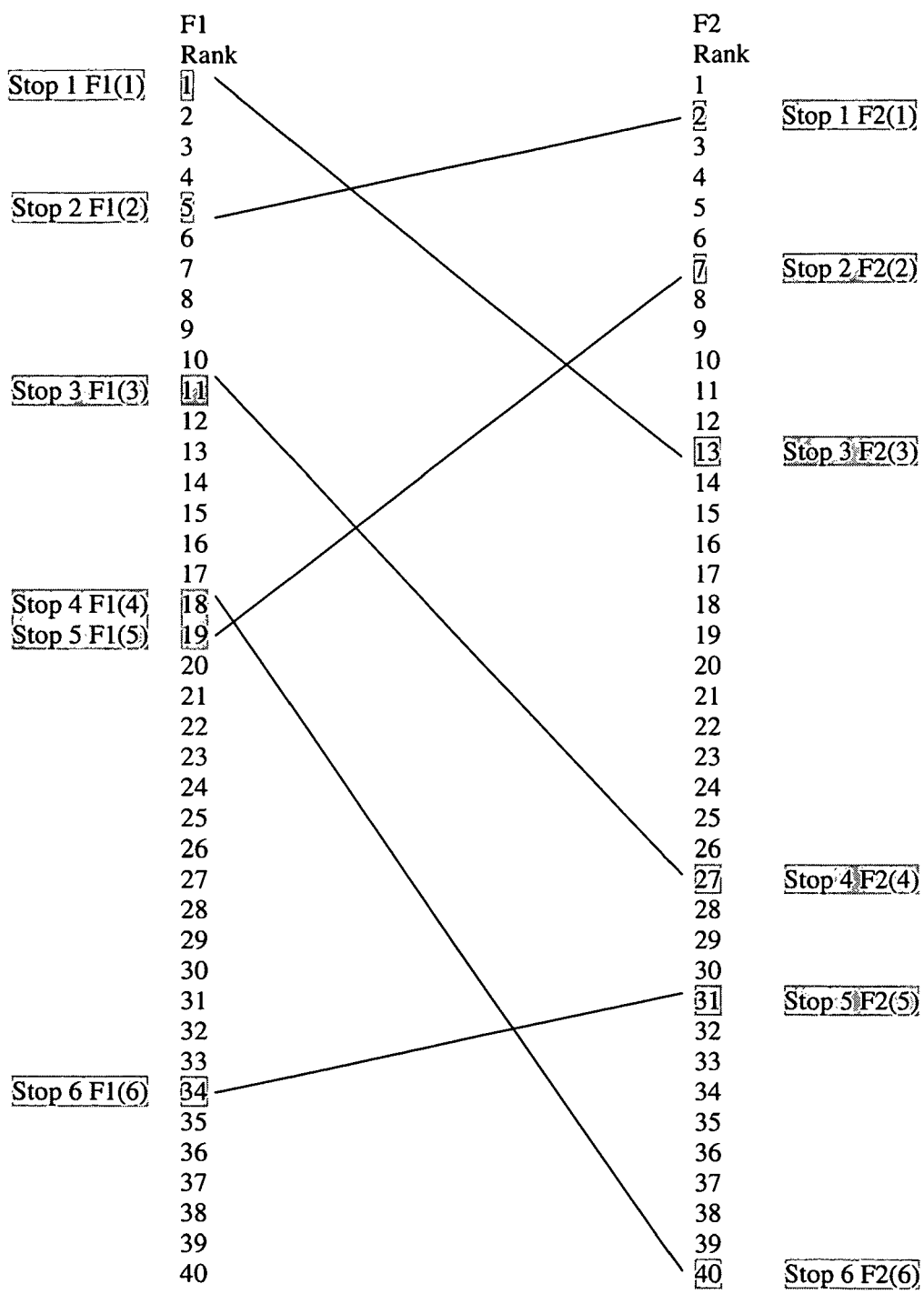
FIG. 11C is a representation of features lists of two feature sets (F1 and F2) that are to be correlated to one another. Lines indicate features that are mapped to or aligned with one another.

A few sample iterations based on the F1 and F2 shown in FIG. 11C are shown below:

---

Iterate through F1 stops at ranks 1, 5, 11, 18, 19, 34 imax = 6
    i = 1 Stop 1
    Rank F1(1) = 1
    Align(F1(1)) = F2(3); j=3
    Rank F2(3) = 13
    Sorted vector [13]
        $p_{1,3}$ = .0274 (set as global)
        Any values in vector greater than 13? No
    i=2 Stop 2
    Rank F1(2) = 5
    Align(F1(2)) = F2(1); j=1
    Rank F2(1)=2
    Sorted vector [2,13]
        $p_{2,1}$ = .00269 (set as global)
        Any values in vector greater than 2? Yes
        j=3 (corresponds to rank 13)
        $p_{2,3}$ = .00157 (set as global)
    i = 3 Stop 3
    Rank F1(3)=11
    Align(F1(3))=F2(4); j=4
    Rank F2(4)=27
    Sorted vector [2,13,27]
        $p_{3,4}$ = .00129 (set as global)
        Any values in vector greater than 27? No

---

The process continues for F1 stops 4-6.

To improve computational efficiency, various optimizations may be implemented. One optimization is shown in FIG. 11A at operation 1130, in which stop i may be skipped if the next stop is contiguous and links to a higher rank. In the flow chart of the figure, prior to defining the sub-F1(i) set, the rank F1(i+1) is compared to the rank (F1(i))+1. If these are equal, the F1(i) and F1(i+1) are contiguous. If they are contiguous and rank Align(F1(i+1))<rank Align(F1(i)), then the stop may be skipped.

For example, returning to FIG. 11C, for i=4:

---

Rank F1(i+1)=Rank(4+1)=Rank(5)=19
    Rank F1(4)+1=18+1=19
    Align(F1(i+1))=Align(F1(5))=F2(2)
    Rank F2(2)=7
    Align(F1(i))=Align(F1(4))=F2(6)
    Rank F2(6)=40

---

Because the F1(4) and F1(5) stops are ranked 18th and 19th and so are contiguous and because F1(5) links to a higher F2 rank (7) than F1(4), stop 4 may be skipped, as stop 5 will result in a better p-value.

A second optimization may be performed on the inner loop, wherein the calculation at a "j" may be skipped if the next j-value is contiguous, i.e., if j+1 is an element of the vector. This is essentially the same optimization as described above for the feature set to feature group correlation.

In certain embodiments, two feature sets are correlated according to the iterative rank-based algorithm described with reference to the process flow sheet shown in FIG. 6. Here, feature sets F1 and F2 are received in an operation 601, each with a ranked list of mapped features. For a bi-directional feature set, F1 and/or F2 is just the up-expressed or down-expressed features of the bi-directional feature set. FIG. 1C shows an example of a feature table with a ranked list of up-expressed features from the feature table shown in FIG. 1B. In an operation 603, a subset of feature set F1 is determined by taking the top "x" features of the feature set, where "x"=a percent of the platform size. This subset is referred to in FIG. 6 as $F1_{top\ \%}$. For example, if the platform is a gene chip with 14,000 genes, x may be 2% of 14,000, or 280 features. The percent typically ranges from 1-10%. Because the percentage is based on platform size, for small feature sets, $F1_{top\ \%}$ may be the same size of F1. In an operation 605, $F1_{top\ \%} \cap F2$, i.e., the features in $F1_{top\ \%}$ that are mapped to features in F2, are determined. (See FIG. 10 of the attached Appendix for a feature set to feature set diagram). A schematic in FIG. 7 shows a simple example in which $F1_{top\ \%}$ contains the ten top ranked features in F1 (indicated in bold). (Note that in the example in FIG. 7, the feature ranks are contiguous, though this may not be the case when F1 and/or F2 contain only the up-expressed or down-expressed features of a bi-directional feature set.) Feature X is then determined (607). Feature X is the next feature in $F1_{top\ \%} \cap F2$ in rank order of F2. Thus, for the first iteration of the process as applied to the feature sets shown in FIG. 7, Feature X is the feature ranked 2, which is indicated at Stop 1. This is the first checkpoint. Returning to FIG. 6, a sub-feature set $F2_x$ is determined (609). Sub-feature set $F2_x$ is the set of all features having a rank equal to or higher than X. So, for the first iteration, sub-feature set $F2_x$ contains the features ranked 1 and 2 of F2. Fisher's exact test is then performed for sub-feature sets $F1_{top\ \%}$ and $F2_x$ in an operation 611, using the parameters described in FIG. 10 and associated text of the Appendix. The resulting p-value, $p_x$ is then compared to a global p-value, and if it is less than the global p-value, it is saved as the (new) global p-value. For the first iteration, where there is no pre-existing global p-value, $p_x$ is saved as the global p-value with which to be compared in the successive iteration. Decision 615 then determines if there are any remaining features in $F1_{top\ \%} \cap F2$. If there are, the process returns to operation 607, in which feature X is identified. For example, for the second process iteration of the schematic shown in FIG. 7, feature X is the feature ranked 13, and sub-feature set $F2_x$ contains features ranked 1-13. Essentially, the process looks at all possible p-values for all sub-feature sets $F2_x$ and selects the lowest p-value. It should be noted that performing Fisher's exact test only at the "stop" points indicated returns the same result as if it were performed at each ranked feature. This is because the p-values from Fisher's exact test performed at all non-stop points will be higher than the global p-value.

Once there are no remaining features in $F1_{top\ \%} \cap F2$, a multiple-hypothesis testing correction may be applied to the global p-value to obtain a final p-value for feature set $F1_{top\ \%}$ and feature group F2 (617). Multiple-hypothesis testing corrections are known in the art and account for the fact that larger feature sets return lower p-values, as there are more opportunities for lower p-values to be received with larger feature sets.

Operations 603-617 are then performed again, this time for $F2_{top\ \%}$ and iterating over all of F1. See 619. The result is a p-value or correlation score for $F2_{top\ \%}$ and F1. The two p-values or correlation scores obtained in 617 and 619 are then averaged by taking geometric mean of p-values or arithmetic mean of scores to obtain a final score correlation score for F1 and F2 (621). This final p-value is then stored, e.g., in a Scoring Table. In certain embodiments, a 'rank score' is stored in the Scoring Table in addition to or instead of the final p-value. Briefly, the rank score is a derivative of the final p-value and is the negative logarithm of the p-value.

Figure 6:
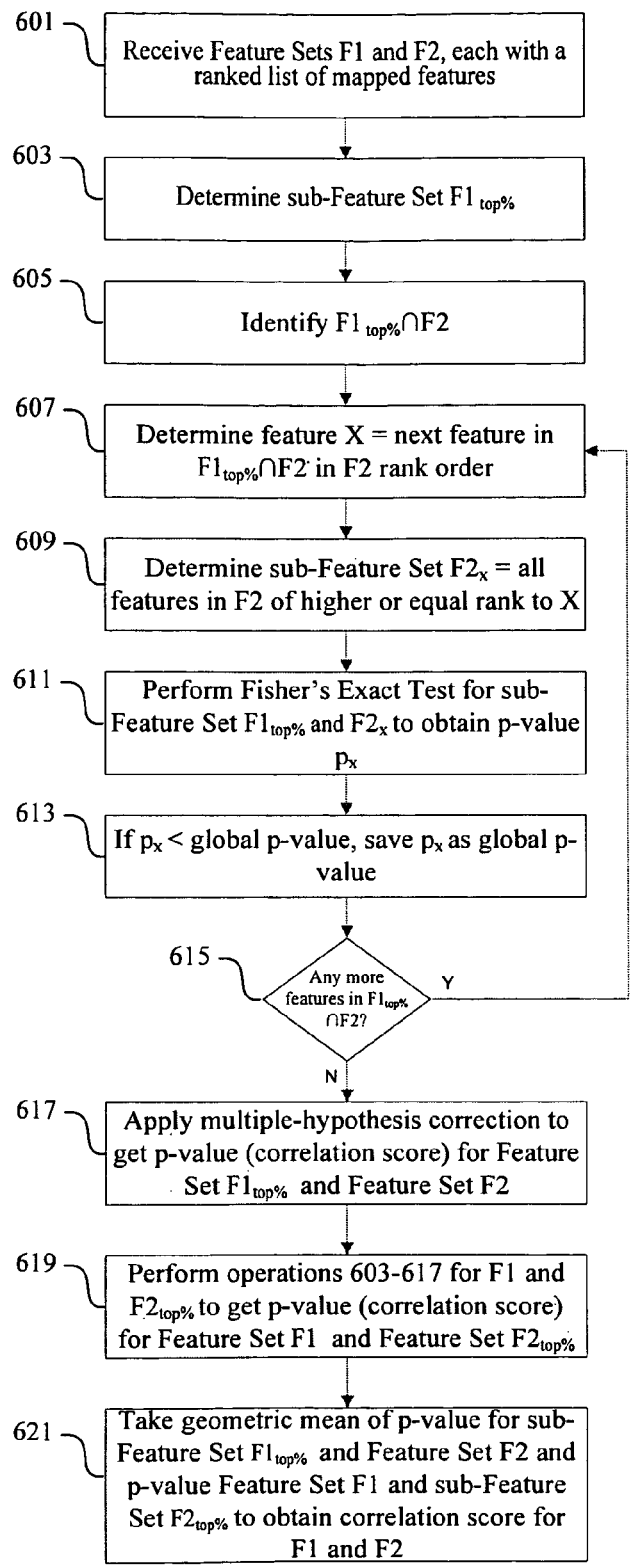
FIG. 6 is a flow diagram presenting steps in correlating a feature set to another feature set.
Figure 7:
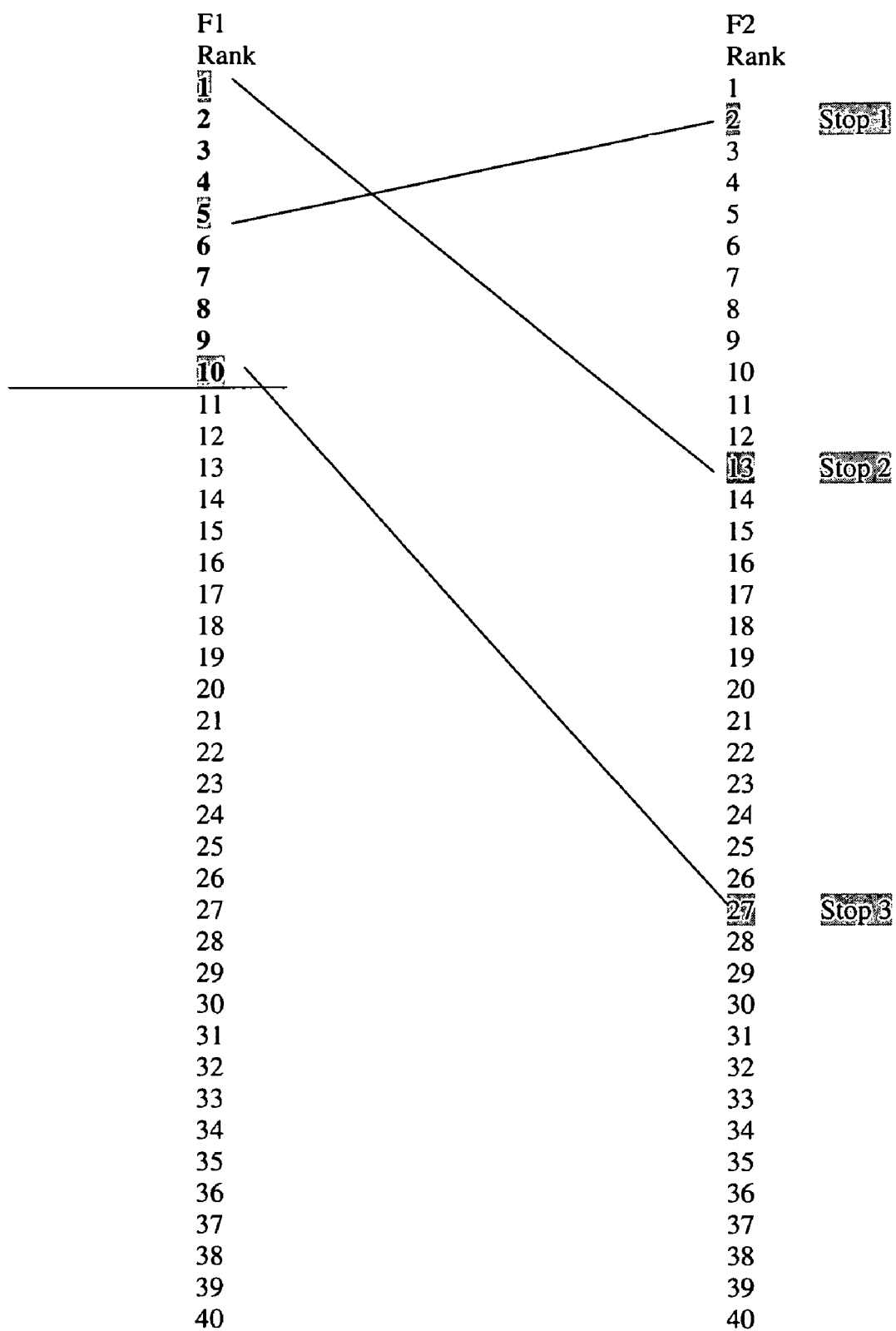
FIG. 7 is a representation of features lists of two feature sets (F1 and F2) that are to be correlated to one another using the process described in FIG. 6. Stop or checkpoints used in a correlation process are shown on the diagram.

Note that for bi-directional feature set correlation scoring, the process described in FIG. 6 results in just one of the multiple individual correlation scores to be obtained. For correlation scoring as described in FIG. 2 between two bi-directional feature sets, this process is performed four times to obtain the four individual correlation scores used to obtain the overall correlation score and correlation direction.

2. Producing a Knowledge Base

Figure 12:
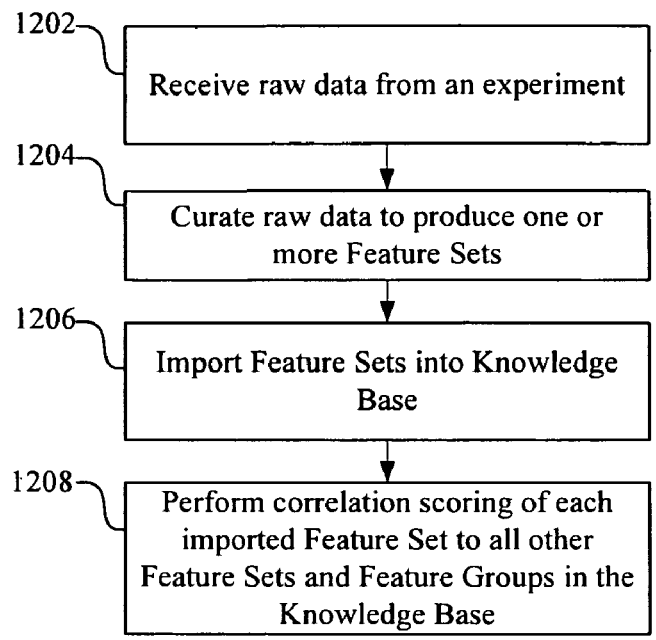
FIG. 12 is a process flow diagram presenting key steps employed to generate a knowledge base in accordance with one embodiment of the present invention.
Figure 13A:
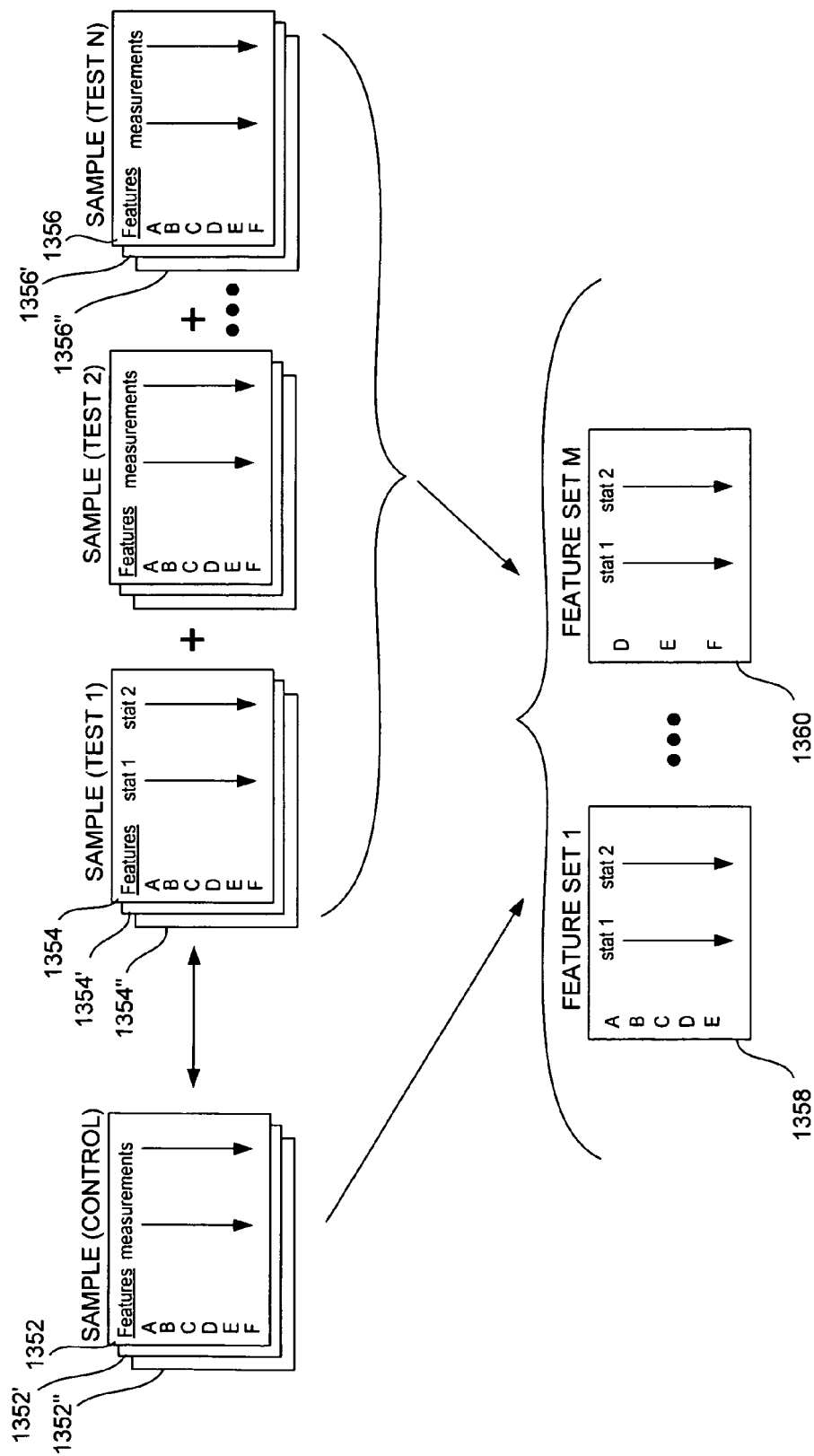
FIG. 13A is a schematic representation of raw data and data sets (feature sets) generated from raw data for use in a knowledge base.
Figure 14:
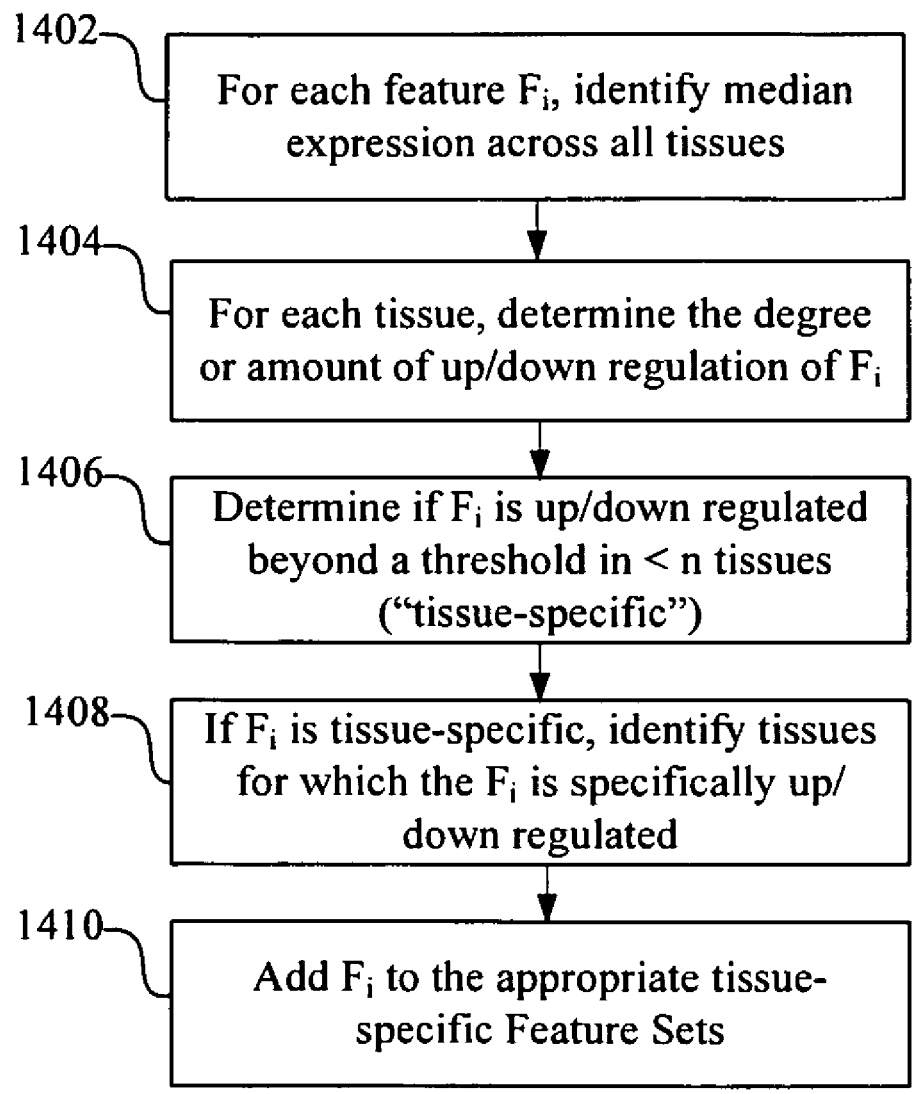
FIG. 14 is a flow diagram presenting key steps employed in generating tissue-specific feature sets from multi-tissue experiments or studies in accordance with one embodiment of the present invention.
Figure 15:
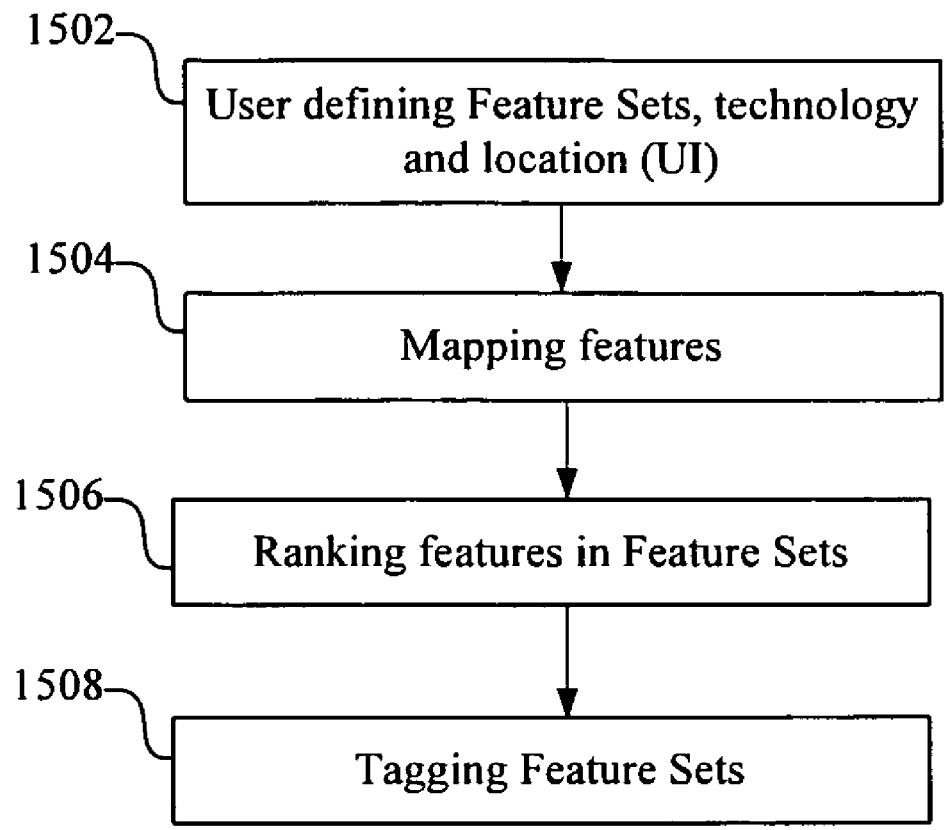
FIG. 15 is a flow diagram presenting key steps employed in importing data into a knowledge base in accordance with one embodiment of the present invention.

Aspects of the present invention relate to producing and navigating a knowledge base—a database of diverse types of biological, chemical and/or medical information. The following description presents one process by which data for a knowledge base according to the present invention may be obtained. FIG. 12 shows an overview of the process of producing a knowledge base; FIGS. 13-15 describe aspects of the process in greater detail.

In one embodiment, the knowledge base contains feature sets and feature groups from a number of sources, including data from external sources, such as public databases, including the National Center for Biotechnology Information (NCBI). In addition, proprietary data obtained and processed by the database developer or user is generally used.

FIG. 12 shows an overview of the process of producing a knowledge base. The process begins with receiving raw data from a particular experiment or study (1202). The raw data may be obtained from a public database, private sources, an individual experiment run in a lab, etc. The raw data typically contains information for control and test samples. For example, in a gene expression study of lung cancer, the raw data includes expression profiles for normal (control) and tumor (test) lung cells. The raw data from the study or experiment may contain additional information, e.g., the gene expression profiles may also be associated with a particular disease state, or with patients having different clinical parameters (age, gender, smoker/non-smoker, etc.). Once the raw data is received, it is curated to produce one or more feature sets (1204). A feature set is a set of features identified as being significant in a given experimental setting and associated statistical information. For example, the features of one feature set from the lung cancer gene expression study would be the set of genes that are differentially expressed between tumor and normal cells. Associated statistical information might indicate the fold change or a p-value associated with each feature, representing the change of the feature between the experimental and control conditions. Feature sets are generated from a particular study or experiment and are imported into the knowledge base (1206). As described below, importing the data typically involves tagging the feature set with appropriate biomedical or chemical terms, as well as automatically mapping each feature in a feature set, i.e., establishing connections between each imported feature and other appropriate features in the knowledge base as appropriate. The next major operation in producing a knowledge base is correlation scoring of each imported feature set with all other feature sets and feature groups in the knowledge base (1208). After correlation scoring, the correlation, e.g., in the form of a p-value, of a feature set with all other feature sets and all feature groups is known and stored.

Once the process in FIG. 12 is performed, the user is able, by submitting queries and navigating, to efficiently explore and connect biological information contained in the knowledge base. The process illustrated in FIG. 1 may be performed anytime a user wishes to add experimental data to the knowledge base.

A. Curating

As indicated above, curation is the process of generating feature sets from raw data. FIG. 13A presents a graphical representation of raw data and the resulting feature sets. Raw data includes the data for control and test samples; in the example depicted in FIG. 13A, data 1352 includes measurements (e.g., intensity measurements from a microarray) for features A-F. Typically, the data includes replicate data; here the control sample replicates are indicated as data 1352' and 1352". One experiment typically contains multiple test samples. Test sample data is shown in the figure as Sample (test 1) data (1354 and replicates 1354' and 1354"), test 2 data, . . . test N (1356 and replicates 1356' and 1356"), each with identified features and associated statistics. In the simplest case there is only one test and one control sample (each typically having one or more replicates). More typically, there will be multiple test samples. In one example, each test sample represents a different concentration of a potential therapeutic compound. In another example, each test sample represents a tissue sample taken from a patient with a different clinical indication (e.g., lung tissue samples from non-smokers, from smokers of various levels, from drivers of diesel vehicles, from patients before treatment administration and after, etc.).

The samples from which raw data is generated typically contain many different types of information, especially when it comes to clinical samples. For example, raw data from an experiment measuring differential gene expression between tumors of different patients—e.g., in tumor stage 1 and tumor stage 2 cells—may also contain information on other attributes of those patients in this example, beyond whether they are tumor stage 1 or tumor stage 2, e.g., whether they are smokers, their age, their prior treatment, year of diagnosis, etc.

The curation process generates one or more feature sets, which are shown in the example depicted in the figure as feature set 1 (1358) to feature set M (1360). feature sets contain statistics derived from measurements in the raw data. In the figure, these are labeled stat 1 and stat 2, e.g., a p-value and a fold change. P-values generally refer to the probability of obtaining a result at least as extreme as that obtained and are one type of data that may be in the raw data. Fold change typically refers to the magnitude of change (2-fold, 3-fold, etc.) of some measurement in control and test samples. Each feature set relates to a different biological, clinical, or chemical question (e.g., up-regulation in response to compound treatment; up-regulation in a particular tissue, etc.). Hence each feature set may have a different collection of features as only features identified in curation as statistically relevant to a given question are included in a particular feature set. For example, feature set 1 in FIG. 13A contains features A-E and feature set M contains features D, E and F. Similarly, each feature set may contain different associated statistical measures as appropriate for the set. The depiction of raw data in FIG. 13A is merely an example of how raw data may be presented.

Figure 13B:
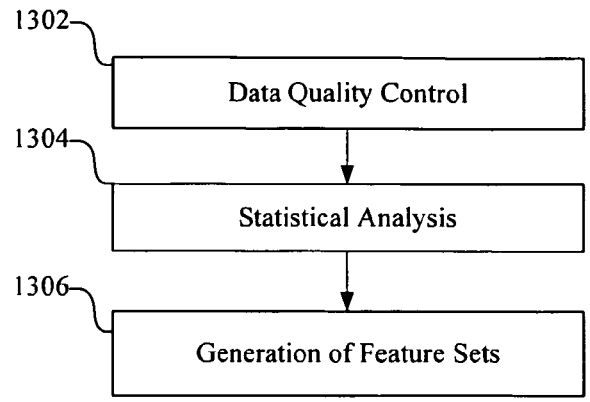
FIG. 13B is a flow diagram presenting key steps employed in curating raw data in accordance with one embodiment of the present invention.
Figure 13C:
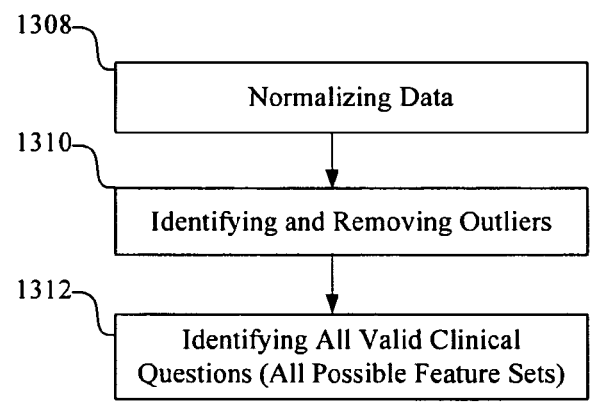
FIG. 13C is flow diagram presenting key steps employed in a data quality control operation of a curating process in accordance with one embodiment of the present invention.

FIG. 13B is a process flowsheet that depicts an overview of a curation process. The process begins with data quality control (1302). Data quality control is an operation that includes normalizing the data, removing outlying data and identifying all valid clinical questions (i.e., identifying all possible feature sets). FIG. 13C presents a process flowsheet showing operations in one embodiment of a data quality control process. The process begins with normalizing the data (1308). Normalization strategies for various types of data are well-known in the art. Any appropriate normalization strategy may be used. Outliers are then identified and removed (1310). This is typically performed on a per sample basis (i.e., outlying samples are removed). Standardized processes for identifying outliers are also well-known. Once the data is normalized and the outliers are removed, valid clinical questions associated with the experiment are identified (1312). In certain embodiments, this is tantamount to identifying possible feature sets. In one example, genes for proteins in one pathway comprise features for a first Feature set and genes for proteins in a different pathway comprise features for a different Feature set. In this case, the clinical questions defining the feature sets pertain to the impact of a particular stimulus or treatment on features measured, ultimately identifying genes in two distinct cellular pathways. In many cases, clinical question are questions that the experiment was designed to answer or measure. This may be designated as a valid clinical question, and the related feature set would contain the features for which there is a statistically significant difference between control and test sample. (The features in each feature set are typically determined in the subsequent statistical analysis operation described below). Valid clinical questions may also be questions that the experiment was not necessarily designed for, but that the raw data gathered supports. For example, an experiment may be designed to compare tumor stage 1 and tumor stage 2 samples, with the data published with associated clinical annotations that show Her2-positive patients and Her2-negative patients. One feature set may be up-regulation of genes in tumor stage 2 versus tumor stage 1 samples (i.e., the feature set contains genes that are up-regulated in tumor stage 2 samples) and another feature set may be up-regulation of genes in Her2-positive versus Her2-negative patients (i.e., the feature set contains genes that are up-regulated in Her2-positive patients). A clinical question may be deemed "valid" if there is enough statistically significant data to support the clinical comparison.

In many cases, the raw data contains features that can be associated with a large number of different clinical parameters or attributes of the patient, e.g., smoker/non-smoker, drugs taken, age, tumor stage, etc. Identifying valid clinical questions involves determining if any differences in features for two groups of data (e.g., smoker versus non-smoker) is statistically significant. Identifying valid clinical questions may be performed by any appropriate methodology, including brute force methods and more sophisticated methods. For example, a multi-ANOVA type analysis may be performed on the entire raw data set containing different clinical parameters to find which parameters have a statistically significant effect on differential gene expression (or other change in measured features). In certain embodiments, clustering may be applied to data to, e.g., compare samples of clusters of data groups to see if statistically significant comparisons of groups that may be used to generate feature sets are present.

Figure 13D:
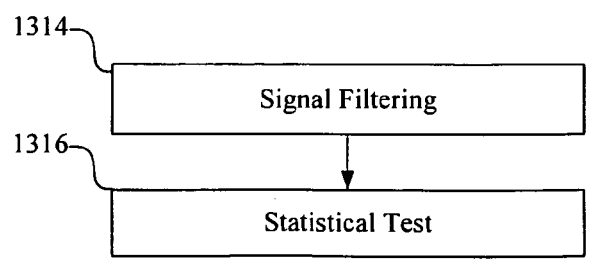
FIG. 13D is a flow diagram presenting key steps employed in a statistical analysis operation of a curating process in accordance with one embodiment of the present invention.

Returning to FIG. 13B, once the valid clinical questions have been identified, statistical analysis is performed to obtain statistical measures such as p-value, fold change, and other relevant statistical/measurement information. FIG. 13D shows an overview of one statistical analysis process. The process starts with signal filtering (1314), an operation in which features whose corresponding signals are below a threshold intensity (or other measurement) are filtered out. For example, fluorescent signals from a microarray are analyzed on a gene-by-gene basis with signals below a threshold filtered out. In this manner, a reduced set of genes is generated. One or more statistical tests are then performed on a feature-by-feature basis to determine for what features the differential measurement between control and test is significant enough to include the feature in the feature set.

Returning to FIG. 13B, after the clinical questions/possible feature sets are identified (in a Data QC operation 1302) and the features and associated statistics that make up each feature set are identified (in a Statistical Analysis operation 1304), the feature sets are generated (1306). At this point (post-curation, pre-importation), the feature sets typically contain a name and a feature table, the feature table being a list of feature identifiers (e.g., names of genes) and the associated statistics. Generating a feature set involves putting the feature set into an appropriate standardized format for importation into the knowledge base.

i. Tissue-Specific Feature Sets

As indicated above, during the Statistical Analysis portion of the curation process, raw data is looked at on a feature-by-feature basis to determine if there is a statistically significant difference between control and test to include that feature in the feature set in question. In addition, in certain embodiments, tissue-specific feature sets may be generated. Tissue-specific feature sets are feature sets generated from multi-tissue experiments and contain features that show specificity for a particular tissue or tissues. For example, for an experiment measuring gene expression across twelve tissues, one generated feature set may be liver-specific up-regulated genes. The process is typically used with studies having a number of tissues across which a median expression is statistically relevant. In certain embodiments, tissue-specific feature sets are generated for studies across at least twelve tissues. For experiments across highly-related tissues, the number of tissues may be lower (e.g., four).

FIG. 14 is a flow sheet showing a process by which tissue-specific feature sets are generated. The process shown in FIG. 14 is performed for each possible feature in the data set (e.g., each feature remaining in the data set after signal filtering). The process begins with identifying the median expression (or other measurement) of the feature across all tissues (1402). The median expression across all samples in all tissues is used as synthetic control or normal expression of the feature in a tissue. The amount or degree of up/down regulation in each tissue relative to the median is then determined (1404). It is then determined if the feature is tissue-specific or not (1406). A feature is determined to be tissue-specific if it is up or down regulated beyond a threshold in no more than n tissues. For example, a threshold may be a combination of fold change of 2-fold, as well as t-test p-value of 0.05. If a feature is up-regulated by a fold change of at least 2-fold with a maximum t-test p-value of 0.05 in no more than n=3 tissues (e.g., only in liver and lung), it is considered tissue-specific. In the process shown in FIG. 14, up-regulation and down-regulation are considered separately; however, in certain embodiments, these may be considered together (e.g., a feature is determined to be tissue-specific if it is up- or down-regulated in no more than n tissues). If the feature is tissue-specific, the tissues in which the feature is specifically up/down regulated are identified (1408). The feature is then added to the identified tissue-specific feature sets (1410).

It should be noted that the tissue-specific feature sets are typically generated for multi-tissue studies in addition to the feature sets generated by comparing expression between control and test as described above. Thus, if a gene is up-regulated in liver tissue, regardless of whether the up-regulation is tissue-specific or not, the gene is included in a separate feature set that includes genes that are up-regulated in liver.

ii. Directional Feature Sets

In the case of directional feature sets, an indication of the direction of change relative to a control (up/down; positive/negative, etc.) is also typically indicated. In many cases, the direction is indicated by a positive or negative sign, e.g., associated with a fold change or other amount, or in a separate column of the table. The direction may also be indicated by any other appropriate means.

iii. Feature Groups

As discussed above, data is arranged into feature sets and feature groups. Feature groups contain any set of features of interest, typically without associated statistics. Examples of feature groups include any set of features that the researcher is interested in, a set of features that defines a biological pathway, or a set of features that defines a protein family. Curation of feature groups may be performed by any appropriate method. Features involved in particular pathways, or sharing common functions or common structural features may be received from public or private databases, or generated by the researcher or user. After curation, the feature groups typically contain a name, other descriptive information and a list of member features.

B. Importing Data

Once the data is curated and organized in feature sets containing lists of features and associated statistics or feature groups containing lists of features, it is ready to be imported. The importation process involves importing the data into the system, tagging the data with standard terms that describe key concepts associated with the feature set or feature group, and establishing connections between the imported data and all other data within the system. FIG. 15 is a process flowsheet that shows an overview of the Data Importation process.

The process begins in an operation 1502, in which the user defines all relevant files (all feature set and/or feature group files) as well as technology, e.g., the micro array or other platform used to generate the data and any associated information through a user interface. It should be noted that in most cases platform technology does not apply to feature groups, as a feature group typically contains a group of features related biologically and not experimentally. Associated information may include text files that contain descriptions or lists of key concepts of the feature set or feature group. A location for the feature set in a directory system is also typically specified. For example, the user may specify a Project directory and Study subdirectory.

The next operation in the data import process is mapping the features imported (1504). Mapping is the process through which diverse features (e.g., from different platforms, data types and organisms) are associated with each other. For example, a gene may be associated with a SNP, a protein, or a sequence region of interest. During data importation, every feature is automatically mapped. In certain embodiments, mapping involves mapping each feature to one or more reference features or addresses in a globally unique mapping identifier set in the knowledge base (e.g., an index set). Mapping facilitates correlation between all feature sets and feature groups, allowing independent sets of data/information from diverse sources, assay types and platforms, to be correlated.

In certain embodiments, mapping involves the use of an index set that contains addresses or identifiers, each representing a unique feature (e.g., an index set may contain addresses or mapping identifiers representing a single gene of a human or non-human genome). Also in certain embodiments, mapping involves matching imported identifiers (e.g., generic name, GenBank number, etc.) to feature identifiers in the index set. These feature identifiers are various synonyms, genomic coordinates, etc., each of which points to one or more unique mapping identifiers. The mapping process may involve looking up feature identifier(s) that match an imported identifier, and then locating the mapping identifier(s) that the feature identifiers point to. In some cases, the best of a plurality of mapping identifiers is chosen for the mapping.

The mapping process may range from relatively simple (e.g., making a connection between a gene and its protein product) to the more complex (e.g., mapping a connection between a sequence element and a nearby gene on a given region of a chromosome). According to various embodiments, a feature may have a one-to-one mapping, i.e., each feature is mapped to single reference or mapping identifier. In other embodiments, where appropriate, features are mapped to a plurality of references or mapping identifiers. Three categories of mapping that may be employed are: feature-centric mapping, sequence-centric mapping and mapping based on indirect associations. Feature-centric mapping relies on established relationships between various features and their identifiers and is typically employed when there is a standard nomenclature for the feature and identifiers. For example, several different accession numbers can all map to a single gene. A protein product of a gene maps to that gene because that relationship is already established. Two different compound IDs that represent the same substance map to a common drug reference. Different accession numbers of gene A, names for gene A, protein product of gene A, etc. are all mapped to a unique reference for that gene. In case of different organisms, orthologue information may be used to map all data between all available organisms. Sequence-centric mapping creates associations between various features based on their genomic coordinates. Sequence-centric mapping may be useful in situations where established relationships between various identifiers and/or features are unknown or do not exist. Associative mapping does not require a feature to have a one-to-one mapping—having it point to a single reference feature or ID; features may be associated with several features simultaneously. For example, if a sequence region that is being imported falls within a given haplotype block, then associative mapping can be done between that sequence region and all genes within a given haplotype block. Another example is a region that is located within a known binding site of a gene. Although the feature of interest does not map directly to that gene, the region is potentially related to that gene through the binding site that regulates it, and so can be mapped to it. Further details of various mapping processes are described in U.S.

Patent Publication No. 20070162411 and titled "System and Method for Scientific Information Knowledge Management," incorporated by reference herein.

Returning to FIG. 15, features are ranked in an operation 1506. Ranking involves ordering features within each feature set based on their relative levels of response to the stimulus or treatment in the experiment(s), or based on their magnitude and direction of change between different phenotypes, as well as their ability to differentiate different phenotypic states (e.g., late tumor stage versus early tumor stage). Ranking is typically based on one or more of the associated statistics in an imported feature set; for example, features may be ranked in order of decreasing fold-change or increasing p-value. In certain embodiments, a user specifies what statistic is to be used to rank features.

Data tagging is performed in an operation 1508 (operations 1504-1508 may be performed concurrently or in any order).

Tags are standard terms that describe key concepts from biology, chemistry or medicine associated with a given study, feature set or feature group. Tagging allows users to transfer these associations and knowledge to the system along with the data. For example, if a study investigated beta blockers within a muscle tissue then the two tags may be "beta blockers" and "muscle." In addition, if a researcher knows that a given study is relevant to cardiovascular research, he/she can add a tag "cardiovascular disorders". Tagging may be performed automatically or manually. Automatic tagging automatically extracts key concepts for imported data. The system parses all text and documents associated with a given study and automatically captures and scores key concepts (e.g., based on frequency and specificity criteria) that match a database of tags—"standard" biomedical, chemical or other keywords. As indicated above, during the UI portion of the data import process, a user can specify additional files to be imported with the data, for example text descriptions of the experiments or studies. Automatic tagging parses these documents for terms that match tags in the database. In addition to automatic tagging, a user may "manually" or semi-automatically add tags to feature sets and feature groups. The user selects from tags in the database to associate with the feature sets and feature groups. In certain embodiments, the user may enter keywords to search the database. The search extracts the relevant tags and the user may add them to the imported data.

C. Correlation Scoring

The two major types of data/information that a newly imported data set is correlated to are feature sets and feature groups already in the system (e.g., previously imported by any user of the system). A Global Correlation Matrix (GCM) may be used to define all objects and feature sets that should be correlated to a new set of information. Pre-computations are then done according to GCM. Directional and non-directional feature sets are correlated against other feature sets, including other directional feature sets and non-directional feature sets, and against feature groups. Any new query outside of the pre-computed space can use GCM pre-computed scores as the foundation to formulate and compute a more complex query. For example, if a user is interested in identifying signaling pathways in common between two feature sets derived from two different treatment-based experiments, the system will retrieve all pre-computed pathway associations (from GCM) for each feature set and then determine the most highly correlated pathway between the feature sets (based on the pre-computed individual signature-pathway scores).

Correlation scoring of directional feature sets is described above with reference to FIGS. 2-7. Correlation scoring of non-directional features with other non-directional feature sets and feature groups may be performed as described above with reference to FIGS. 6 and 9-11C.

3. Queries

The above description of methods, computational systems, and user interfaces for creating and defining a knowledge base provides a frame work for describing a querying methodology that may be employed with the present invention. The querying methodology described herein is not however limited to the specific architecture or content of the knowledge base presented above.

Generally, a query involves (i) designating specific content that is to be compared and/or analyzed against (ii) other content in a "field of search" to generate (iii) a query result in which content from the field of search is selected and/or ranked based upon the comparison. As examples, general types of queries include feature set queries, feature group queries, feature-specific and concept queries.

Figure 16A:
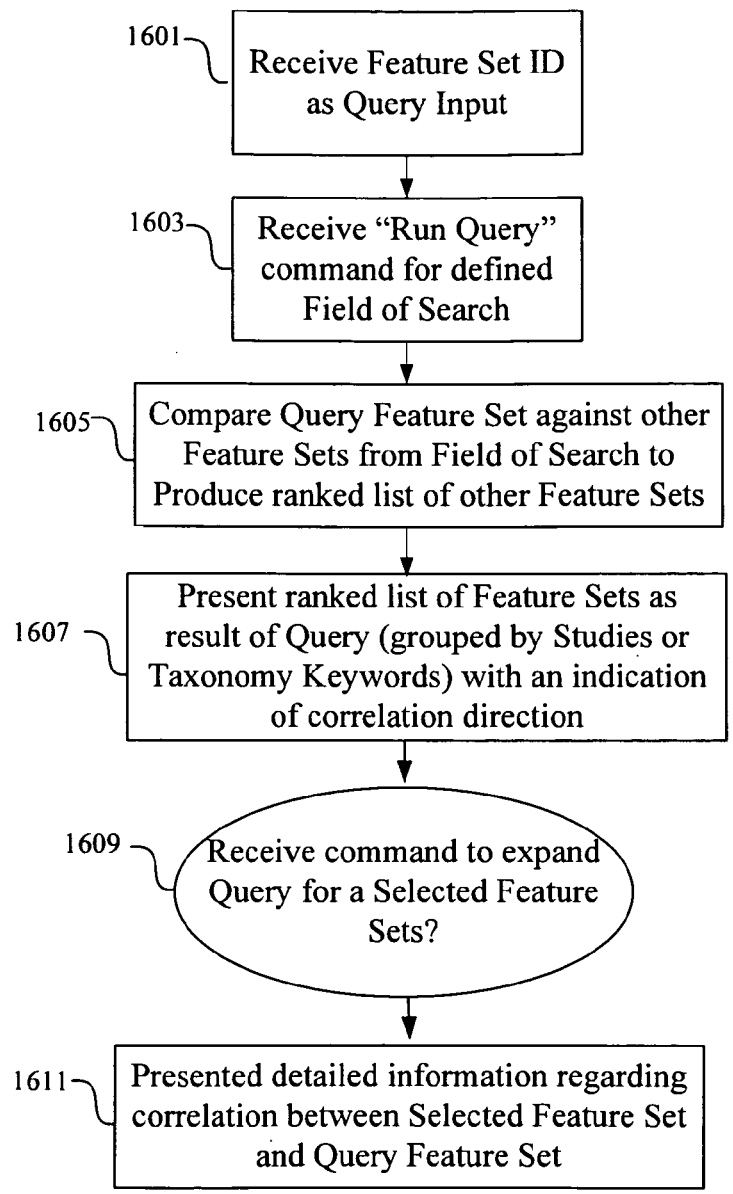
FIG. 16A is a process flow diagram depicting some operations in processing a query employing a single feature set as the query input in accordance with certain embodiments.
Figure 17:
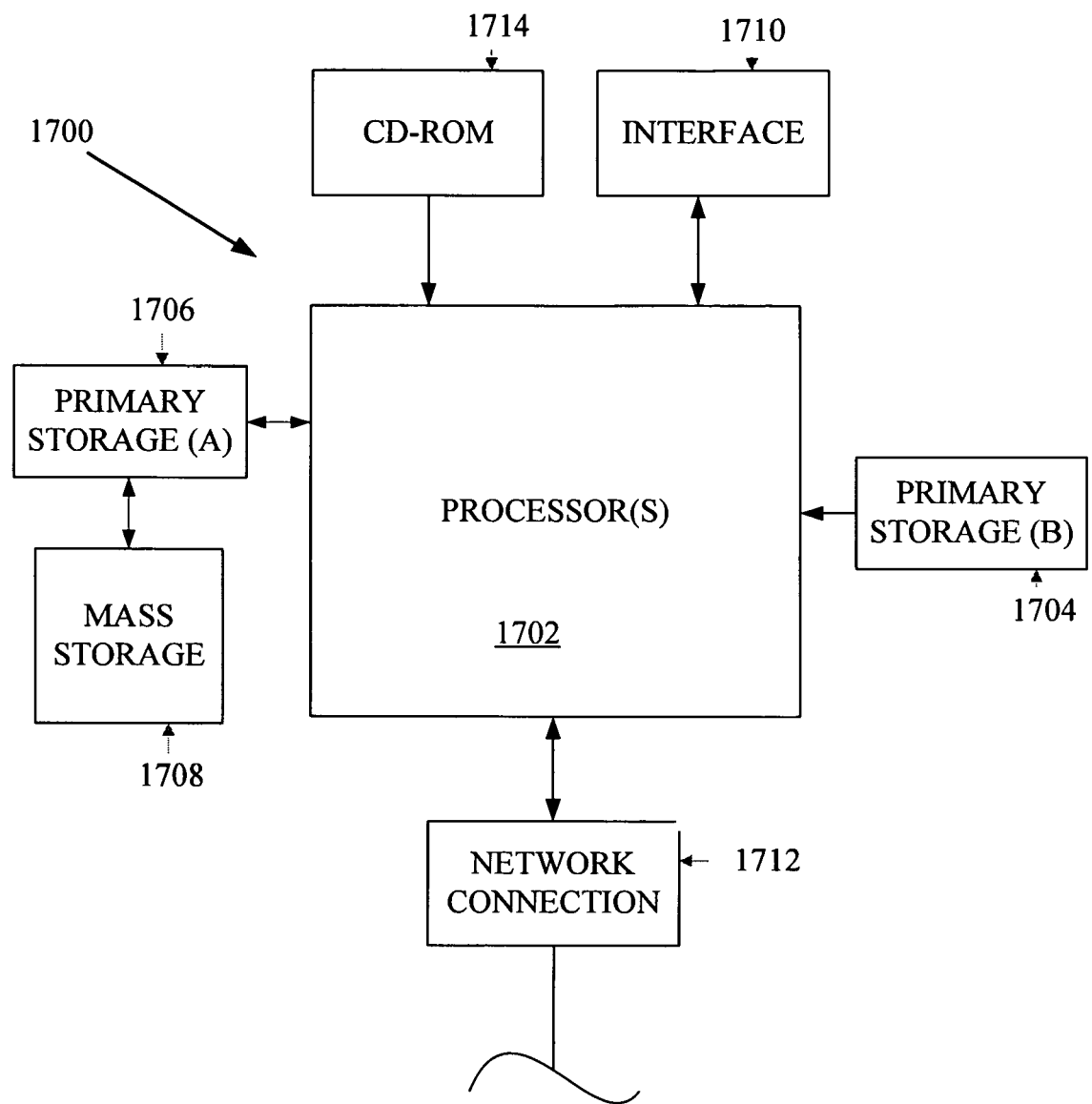
FIG. 17 is a diagrammatic representation of a computer system that can be used with the methods and apparatus described herein.

FIG. 16A depicts a sequence of operations that may be employed when a user identifies a single feature set for the query (as distinguished from the case where the user presents multiple feature sets for a query). In single feature set queries, the user identifies one feature set as an input for running the query. He or she may do this by browsing through a list of feature sets organized by Study and Project or some other ontology such as a hierarchy of taxonomy keywords (Concepts or Tags). Alternatively, the user may manually enter the identity of a feature set he or she is familiar with. Regardless of how the query feature set is entered, the system receives the identity of that feature set as a query input as depicted at block 1601 in FIG. 16A. In certain embodiments such as those employing user interfaces as depicted in FIG. 17, the system will not actually execute a query on the identified feature set until an appropriate command is received. In the context of the flow chart in FIG. 16A, this command is a "Run Query" command as identified at block 1603.

Note that the query may be limited to a particular field of search within the features, feature sets and feature groups of the knowledge base. Of course, the search may include the entire knowledge base and this may be the default case. The user may define a field of search or the system may define it automatically for particular types of feature sets.

To actually generate results for the query, the system compares the query feature set against all other feature sets for the field of search. It may do this employing, for example, the pre-computed scoring tables of a knowledge base as shown in FIG. 1A. As indicated above, such scoring tables may be generated from correlations of each feature set against all other feature sets in the knowledge base and each feature set against all feature groups in the knowledge base. The correlation scores (p-values or otherwise) provide a convenient way to rank all other feature sets in the field of search against the feature set used in the query. Thus, as indicated at block 1605 in FIG. 16A, a comparison of the query feature set against all other feature sets in the field of search is used to produce a ranked list or lists of the other feature sets. In certain embodiments, the comparison of the query feature set against all other feature sets in the field of search involves using pre-computed feature set—concept scores as described in U.S. Provisional Patent Applications Nos. U.S. Provisional Patent Applications 61/033,673 and 61/089,834, referenced above, with comparisons between feature sets used to generate the pre-computed concept scores.

The ranked list can be used to display the other feature sets from the field of search in descending order, with the most highly correlated (or otherwise most relevant) other feature set listed first, at the top of the list. As indicated in block 1607 of FIG. 16A, the resulting ranked list may be presented as a result of the query via a user interface. In certain embodiments, the other feature sets identified at operation 1605 are simply presented as a list of individual feature sets at operation 1607. In other embodiments, for convenience, the other feature sets may not be directly shown in the query results screen. Rather, for example, the Studies containing the query result feature sets are listed, with the feature sets in a particular Study viewed by selecting and expanding the Study. In other embodiments, taxonomy groups are listed as surrogates for the feature sets in the ranked list. Such taxonomy groups may be based on tags such as "cancer" or "stage 2 lymphoma," etc. However the feature sets are presented, as indicated in block 1607, for at least some of the resulting feature sets, an indication of the correlation direction (positive or negative) with the query feature set is presented. In certain embodiments, a correlation direction for Studies or tags listed is presented based on the correlation direction(s) of the feature sets grouped under the Study or tag.

Figure 16B:
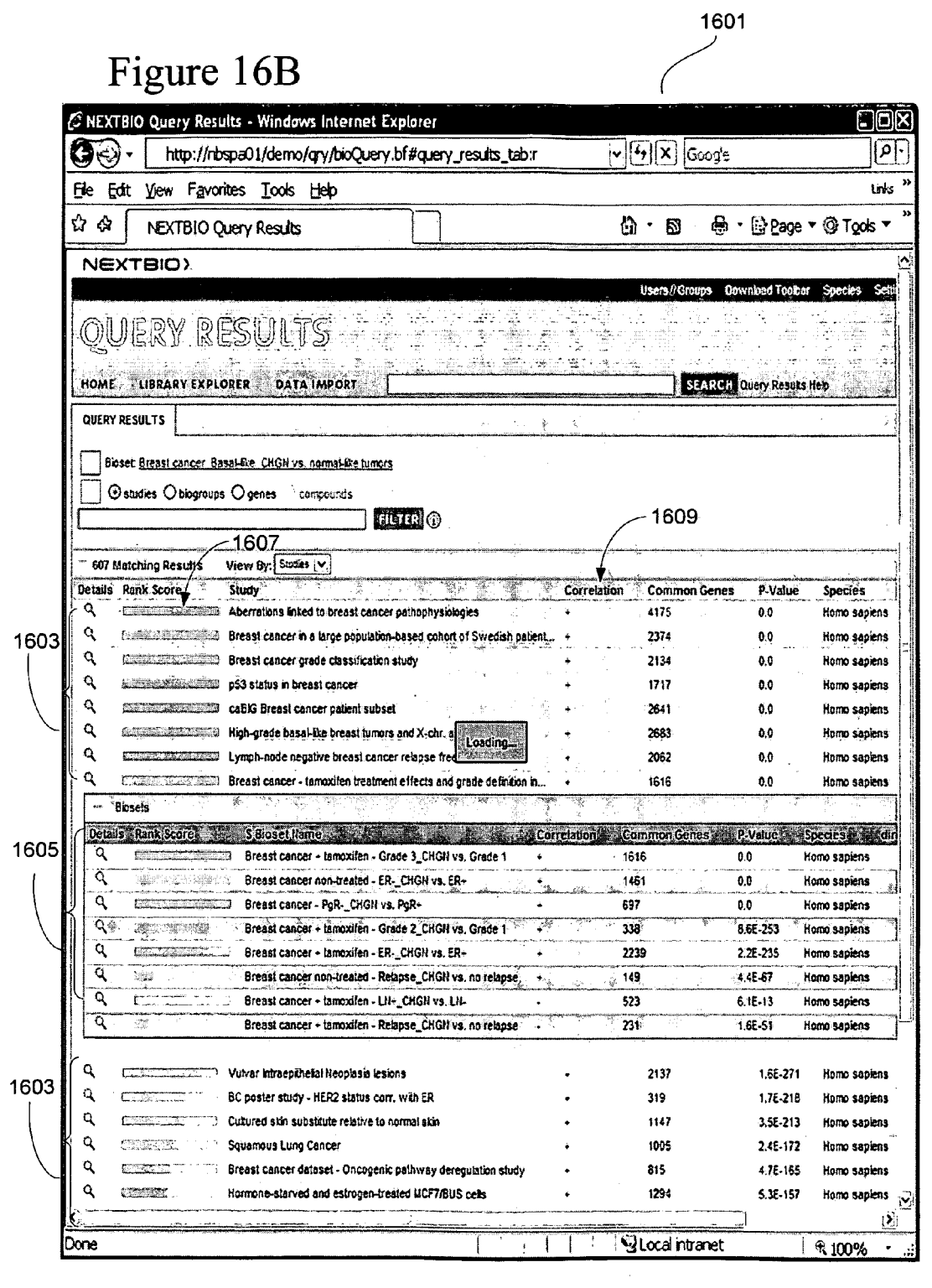

FIG. 16B shows a sample results screen 1651 for a feature set versus feature set query. In this example, the user took a "breast cancer basal-like CHGN vs. normal-like tumors" genes bioset and queried it against all other feature sets in a knowledge base. As shown, Studies containing the ranked feature sets (biosets) resulting from the query are presented as rows 1653. One of the Studies has been expanded to show individual feature sets (biosets) as rows 1655. Note that all feature sets (whether presented as such or as Studies containing them) are depicted with a "rank score" 1657 graphically depicting the relative rank of the feature set. Other columns present common genes, p-values, and species of origin. In addition to the rank score and other information, a correlation direction is presented at 1659 for all feature sets (whether presented as such or as Studies containing them).

After presenting the ranked list of feature sets as a result of the query, the process may be complete. However, in some embodiments, a user may conduct further queries using the feature set provided as the query input. For example, as indicated at decision operation 1609, the system may allow a user to select feature sets to view details on the correlation between the input feature set and the selected feature set or sets. Thus, if decision 1609 is answered in the affirmative (i.e., the user provides a command to expand selected results), the system next presents detailed correlation information on each selected feature set and the query feature set. See block 1611. This information may include the overlapping features between the selected and queried feature set, the individual correlation scores and overlapping features associated with each individual correlation score. In certain embodiments, this information is presented graphically, e.g., as in FIG. 4A, or in the case of bi-directional vs. non-directional features sets, as in FIG. 4B. The process described in FIG. 16A may be modified to present information on queries involving feature sets.

Figure 16C:
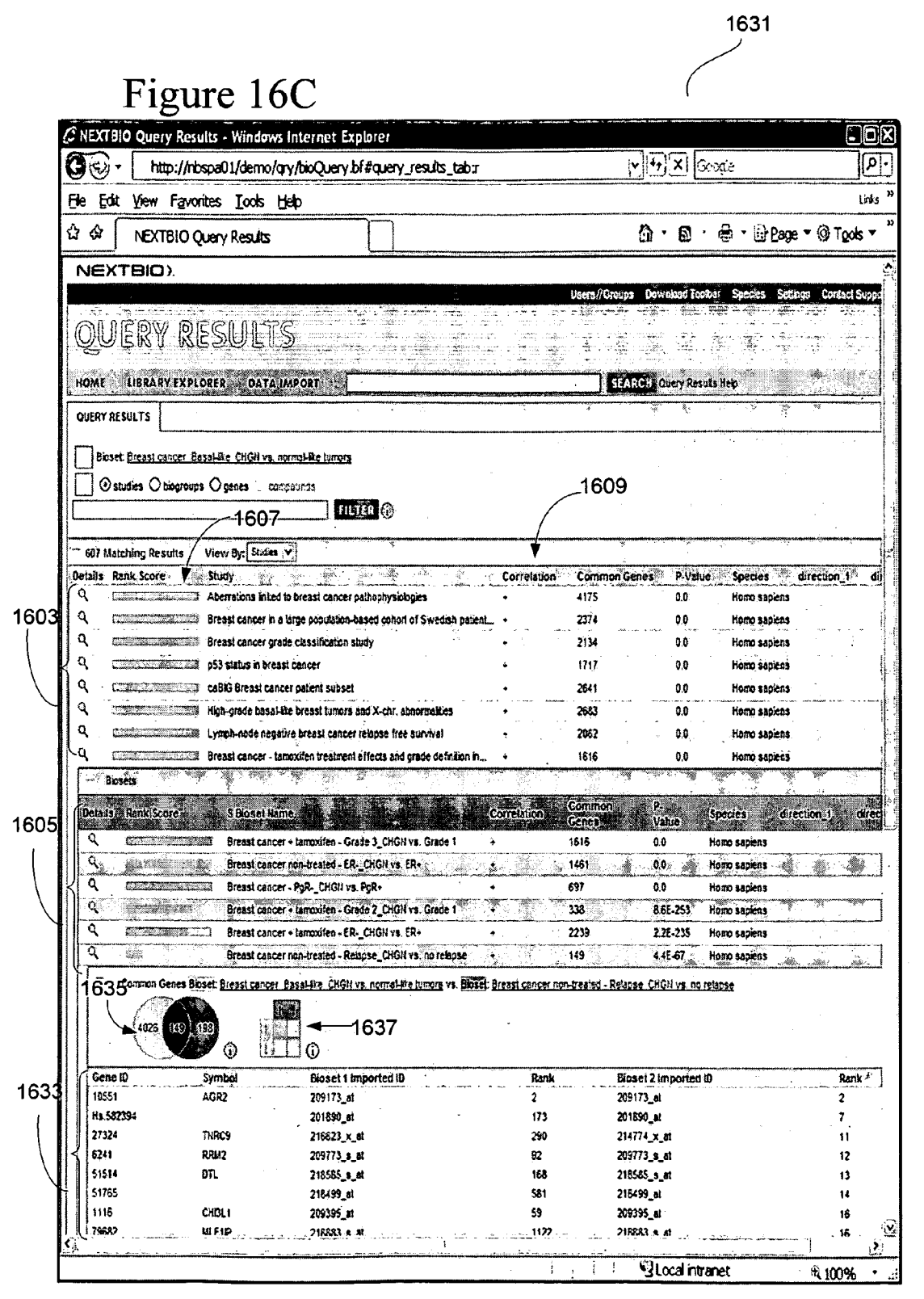
Figure 16D:
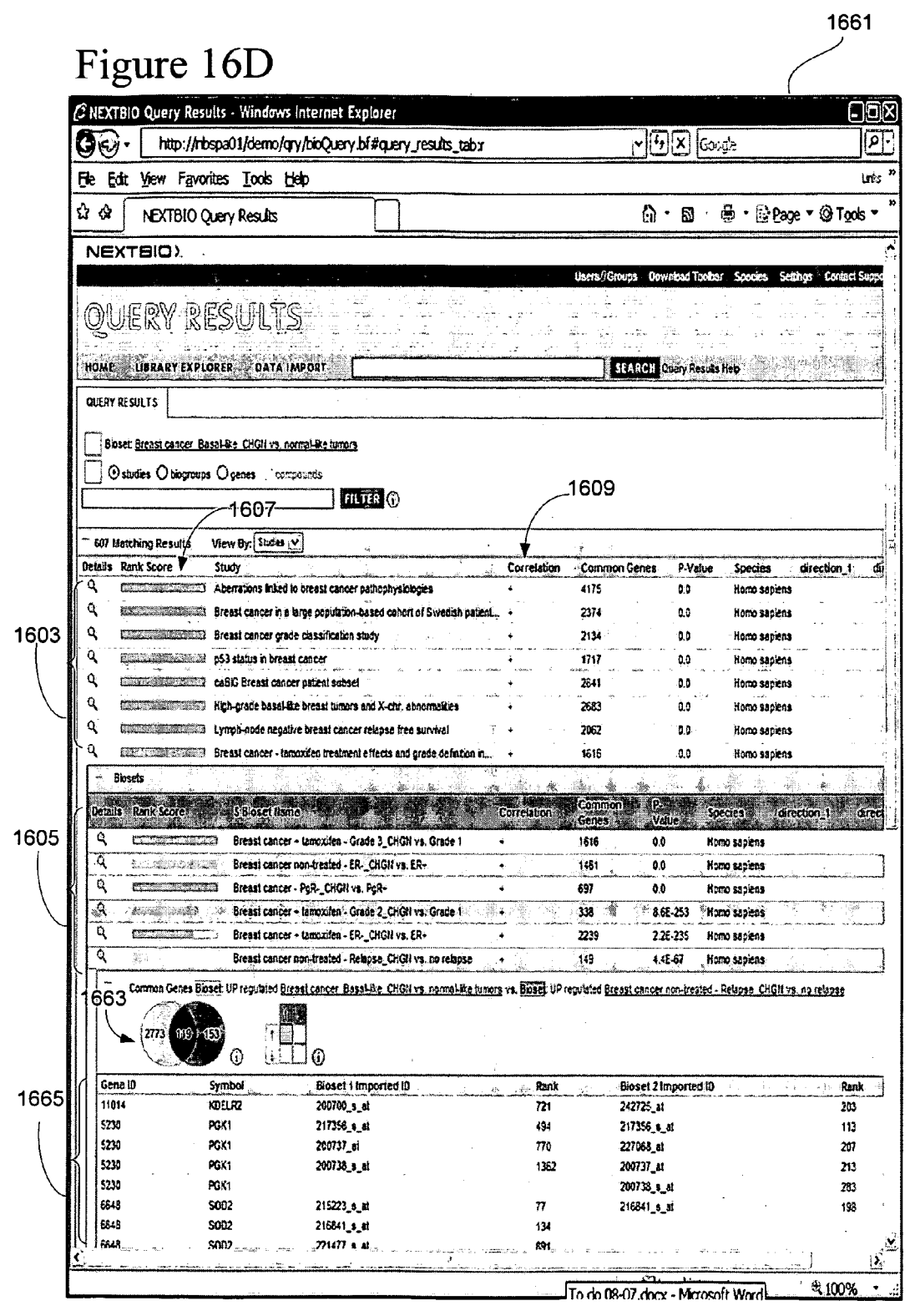

FIG. 16C shows a sample results screen 1681 in which the "Breast cancer non-treated—Relapse CHGN vs. no relapse" bioset has been expanded to show details of the overlap between it and the bioset entered in the query. Features (genes) that overlap between the biosets are presented at 1683 with the feature ranking of the gene in each of the biosets. Each of the two Feature Sets (biosets) and the overlap between the two is represented in the set diagram 1685. Quadrants 1687 represent the up/up, up/down, down/down and down/up overlaps and present another avenue for expanding a query. By clicking on one of the quadrants, the features from that quadrant may be viewed. FIG. 16C shows a sample results screen 1691, in which the up/up quadrant is expanded. Set diagram 1693 now represent the up-regulated genes from both biosets, as well as the overlap. Bioset 1 (Breast cancer Basal-like CHGN vs. normal-like tumors), for example, contains 2773 up-regulated genes, 119 of which overlap with up-regulated genes from bioset 2 (Breast cancer non-treated—Relapse CHGN vs. no relapse). The overlap genes with ranks in each bioset are presented at 1695. The individual correlation scores (up/up, up/down, down/down, down/up) are presented to the user upon mouse over of the corresponding quadrant cells.

4. Computer Hardware

As should be apparent, certain embodiments of the invention employ processes acting under control of instructions and/or data stored in or transferred through one or more computer systems. Certain embodiments also relate to an apparatus for performing these operations. This apparatus may be specially designed and/or constructed for the required purposes, or it may be a general-purpose computer selectively configured by one or more computer programs and/or data structures stored in or otherwise made available to the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines is shown and described below.

In addition, certain embodiments relate to computer readable media or computer program products that include program instructions and/or data (including data structures) for performing various computer-implemented operations associated with at least the following tasks: (1) obtaining raw data from instrumentation, databases (private or public (e.g., NCBI), and other sources, (2) curating raw data to provide feature sets, (3) importing feature sets and other data to a repository such as database or knowledge base, (4) mapping Features from imported data to pre-defined Feature references in an index, (5) generating a pre-defined feature index, (6) generating correlations or other scoring between feature sets and feature sets and between feature sets and feature groups, (7) creating feature groups, (8) receiving queries from users (including, optionally, query input content and/or query field of search limitations), (9) running queries using features, feature groups, feature sets, Studies, taxonomy groups, and the like, and (10) presenting query results to a user (optionally in a manner allowing the user to navigate through related content perform related queries). The invention also pertains to computational apparatus executing instructions to perform any or all of these tasks. It also pertains to computational apparatus including computer readable media encoded with instructions for performing such tasks.

Further the invention pertains to useful data structures stored on computer readable media. Such data structures include, for example, feature sets, feature groups, taxonomy hierarchies, feature indexes, Score Tables, and any of the other logical data groupings presented herein. Certain embodiments also provide functionality (e.g., code and processes) for storing any of the results (e.g., query results) or data structures generated as described herein. Such results or data structures are typically stored, at least temporarily, on a computer readable medium such as those presented in the following discussion. The results or data structures may also be output in any of various manners such as displaying, printing, and the like.

Examples of tangible computer-readable media suitable for use computer program products and computational apparatus of this invention include, but are not limited to, magnetic media such as hard disks, floppy disks, and magnetic tape; optical media such as CD-ROM disks; magneto-optical media; semiconductor memory devices (e.g., flash memory), and hardware devices that are specially configured to store and perform program instructions, such as read-only memory devices (ROM) and random access memory (RAM). The data and program instructions provided herein may also be embodied on a carrier wave or other transport medium (including electronic or optically conductive pathways).

Examples of program instructions include low-level code, such as that produced by a compiler, as well as higher-level code that may be executed by the computer using an interpreter. Further, the program instructions may be machine code, source code and/or any other code that directly or indirectly controls operation of a computing machine. The code may specify input, output, calculations, conditionals, branches, iterative loops, etc.

FIG. 17 illustrates, in simple block format, a typical computer system that, when appropriately configured or designed, can serve as a computational apparatus according to certain embodiments. The computer system 1700 includes any number of processors 1702 (also referred to as central processing units, or CPUs) that are coupled to storage devices including primary storage 1906 (typically a random access memory, or RAM), primary storage 1704 (typically a read only memory, or ROM). CPU 1702 may be of various types including microcontrollers and microprocessors such as programmable devices (e.g., CPLDs and FPGAs) and non-programmable devices such as gate array ASICs or general-purpose microprocessors. In the depicted embodiment, primary storage 1704 acts to transfer data and instructions uni-directionally to the CPU and primary storage 1706 is used typically to transfer data and instructions in a bi-directional manner. Both of these primary storage devices may include any suitable computer-readable media such as those described above. A mass storage device 1708 is also coupled bi-directionally to primary storage 1706 and provides additional data storage capacity and may include any of the computer-readable media described above. Mass storage device 1708 may be used to store programs, data and the like and is typically a secondary storage medium such as a hard disk. Frequently, such programs, data and the like are temporarily copied to primary memory 1706 for execution on CPU 1702. It will be appreciated that the information retained within the mass storage device 1708, may, in appropriate cases, be incorporated in standard fashion as part of primary storage 1704. A specific mass storage device such as a CD-ROM 1714 may also pass data uni-directionally to the CPU or primary storage.

CPU 1702 is also coupled to an interface 1710 that connects to one or more input/output devices such as such as video monitors, track balls, mice, keyboards, microphones, touch-sensitive displays, transducer card readers, magnetic or paper tape readers, tablets, styluses, voice or handwriting recognition peripherals, USB ports, or other well-known input devices such as, of course, other computers. Finally, CPU 1702 optionally may be coupled to an external device such as a database or a computer or telecommunications network using an external connection as shown generally at 1712. With such a connection, it is contemplated that the CPU might receive information from the network, or might output information to the network in the course of performing the method steps described herein.

In one embodiment, a system such as computer system 1700 is used as a data import, data correlation, and querying system capable of performing some or all of the tasks described herein. System 1700 may also serve as various other tools associated with knowledge bases and querying such as a data capture tool. Information and programs, including data files can be provided via a network connection 1712 for downloading by a researcher. Alternatively, such information, programs and files can be provided to the researcher on a storage device.

In a specific embodiment, the computer system 1700 is directly coupled to a data acquisition system such as a microarray or high-throughput screening system that captures data from samples. Data from such systems are provided via interface 1712 for analysis by system 1700. Alternatively, the data processed by system 1700 are provided from a data storage source such as a database or other repository of relevant data. Once in apparatus 1700, a memory device such as primary storage 1706 or mass storage 1708 buffers or stores, at least temporarily, relevant data. The memory may also store various routines and/or programs for importing, analyzing and presenting the data, including importing feature sets, correlating feature sets with one another and with feature groups, generating and running queries, etc.

Although the above has generally described certain embodiments according to specific processes and apparatus, the subject matter of the description provided has a much broader range of implementation and applicability. Those of ordinary skill in the art will recognize other variations, modifications, and alternatives.

What is claimed is:

1. A computer-implemented method of integrating expression-based data into a knowledge base stored on one or more storage devices, knowledge base comprising at least one pre-existing bi-directional feature set, each bi-directional feature set comprising a list of a plurality of features and, for at least some of the listed features, up or down expression information relative to a control sample or normal state, the computer-implemented method comprising:
   receiving a bi-directional input feature set comprising a list of a plurality of features and, for at least some of the listed features, up or down regulation expression information of the feature relative to a control sample or normal state; and
   automatically correlating by one or more processors of a computer system the input feature set with a plurality or all other pre-existing bi-directional feature sets; wherein automatically correlating the input feature set with a bi-directional pre-existing feature set comprises determining by the one or more processors multiple individual correlation scores and, from the multiple individual correlation scores, determining by the one or more processors an overall correlation score and a correlation direction,
   wherein an up regulation expression information indicates a positive correlation score between the input feature set and the pre-existing feature set, a down regulation expression information indicates a negative correlation score between the input feature set and the pre-existing feature set, and
   wherein the input feature set and the pre-existing feature sets are selected from the group consisting of differential expression of said features, responses of said features to a treatment or stimulus, and effects of said features on biological systems.

2. The computer-implemented method of claim 1 wherein the multiple individual correlation scores comprise one or more positive correlation scores and one or more negative correlation scores, wherein a positive correlation score indicates a degree of positive correlation between the input feature set and the pre-existing feature set and a negative correlation score indicates a degree of negative correlation between the input feature set and the pre-existing feature set.

3. The computer-implemented method of claim 2 wherein determining a correlation direction comprises comparing the one or more positive correlation scores with the one or more negative correlation scores.

4. The computer-implemented method of claim 2 wherein determining the one or more positive correlation scores comprises correlating the up-regulation expression information of the input feature set with the up-regulation expression information of the pre-existing feature set and/or correlating the down-regulation expression information of the input feature set with the down-regulation expression information of the pre-existing feature set.

5. The computer-implemented method of claim 2 wherein determining the one or more negative correlation scores comprises correlating the up-regulation expression information of the input feature set with the down-regulation expression information of the pre-existing feature set and/or correlating the down-regulation expression information of the input feature set with the up-regulation expression information of the pre-existing feature set.

6. The computer-implemented method of claim 1 wherein determining multiple individual correlation scores comprises performing rank based statistical algorithms.

7. The computer-implemented method of claim 1 further comprising storing on the one or more storage devices at least the overall correlation score and correlation directions for use in replying to user queries involving a feature set.

8. The computer-implemented method of claim 1 wherein the knowledge base comprises one or more non-directional feature sets and the input feature set is automatically correlated to a plurality or all of the non-directional feature sets.

9. The computer-implemented method of claim 8 wherein automatically correlating the input feature set to a non-directional feature set comprises determining multiple individual correlation scores and from the multiple individual correlation scores, selecting the score that indicates the best correlation of the input feature set with the non-directional feature set.

10. The computer-implemented method of claim 9 wherein determining the multiple individual correlation scores comprises correlating the up-regulation expression information of the input feature set with the non-directional feature set and correlating the down-regulation expression information of input feature set with the non-directional feature set.

11. The computer-implemented method of claim 1, wherein the features comprise genes of an organism, SNPs, or chemical compounds.

12. The computer-implemented method of claim 1, wherein at least one of the bi-directional feature sets comprises information about the feature expression signature of a disease.

13. The computer-implemented method of claim 1, wherein at least one of the bi-directional feature sets comprises information about feature expression response to a stimulus or compound.

14. A computer implemented method of conducting a query in a knowledge base of chemical and/or biological information comprising a plurality of feature sets, each feature set comprising a list of a plurality of chemical or biological features and associated statistical information, the method comprising:
 receiving a query identifying at least one feature set comprising up and down gene regulation expression information, wherein the query is received from a user input to a computer system;
 using precomputed correlation scores between the at least one identified feature set and other content in the knowledge base to determine feature set rankings in reply to said query; and
 presenting the user with a ranked list of feature sets as determined by the precomputed correlation scores, and, for at least some of the feature sets in the ranked list, an indication of whether the correlation of that feature set with the identified feature set is positive or negative; and
 wherein an UP gene regulation expression information indicates a positive correlation score between the identified feature set and the feature set in the knowledge base, a down gene regulation expression information indicates a negative correlation score between the identified feature set and the feature set in the knowledge base, and
 wherein the identified feature set and the feature set in the knowledge base are selected from the group consisting of differential expression of said features, responses of said features to a treatment or stimulus, and effects of said features on biological systems.

15. The computer implemented method of claim 14 further comprising presenting the user with information about the correlation between each of the up and down regulation expression information of the identified feature set and each of the up and down feature regulation expression information of at least one listed feature set.

16. A method of providing data to a knowledge base of scientific information, the method comprising:
 (a) receiving raw data from one or more samples, wherein the raw data includes information on one or more features with indications of the magnitude and direction of change of those features, relative to a normal state or control sample, in response to a treatment or stimulus;
 (b) producing an input feature set from the raw data by removing or reorganizing information about at least some less relevant features;
 (c) correlating by one or more processors of a computer system the input feature set against a plurality or all of the pre-existing feature sets in the knowledge base;
 (d) correlating by one or more processors of a computer system the input feature set against one or more feature groups in the knowledge base, wherein the feature groups provide collections of features having structural and/or functional characteristics in common; and
 (e) storing on one or more storage devices correlation information generated in (c) and (d) for use in responding to queries involving feature groups or feature sets,
 wherein the features are selected from the group consisting of biological entities, chemical entities, biological information and chemical information, and
 wherein the input feature set and the pre-existing feature sets are selected from the group consisting of differential expression of said features, responses of said features to a treatment or stimulus, and effects of said features on biological systems.

17. The computer-implemented method of claim 1, wherein the input bi-directional feature set is a gene expression profile.

18. The computer implemented method of claim 14 wherein the ranked list of features is outputted to a display of the computer system.

* * * * *